(12) United States Patent
Bingle et al.

(10) Patent No.: US 10,913,401 B2
(45) Date of Patent: *Feb. 9, 2021

(54) VEHICULAR CAMERA MODULE

(71) Applicant: MAGNA ELECTRONICS INC., Auburn Hills, MI (US)

(72) Inventors: Robert L. Bingle, Holland, MI (US); Joseph Camilleri, Brighton, MI (US); Peter J. Whitehead, Grafton, WI (US); Kenneth Schofield, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,569

(22) Filed: Mar. 23, 2020

(65) Prior Publication Data
US 2020/0215994 A1 Jul. 9, 2020

Related U.S. Application Data

(60) Continuation of application No. 16/413,703, filed on May 16, 2019, now Pat. No. 10,596,982, which is a (Continued)

(51) Int. Cl.
*B60R 11/04* (2006.01)
*B60R 16/03* (2006.01)
(Continued)

(52) U.S. Cl.
CPC .......... *B60R 11/04* (2013.01); *B60R 1/02* (2013.01); *B60R 1/04* (2013.01); *B60R 1/12* (2013.01);
(Continued)

(58) Field of Classification Search
USPC .......................................... 348/148
See application file for complete search history.

(56) References Cited

U.S. PATENT DOCUMENTS

| 4,712,879 A | 12/1987 | Lynam et al. |
| 4,786,966 A | 11/1988 | Hanson et al. |

(Continued)

FOREIGN PATENT DOCUMENTS

| JP | 08084277 | 3/1996 |
| WO | 2007053404 A2 | 5/2007 |

OTHER PUBLICATIONS

International Search Report and Written Opinion for corresponding PCT Application No. PCT/US03/36177.

*Primary Examiner* — Behrooz M Senfi
(74) *Attorney, Agent, or Firm* — Honigman LLP

(57) ABSTRACT

A vehicular camera module includes a camera having a CMOS image sensor and a lens. The image sensor is disposed at a first printed circuit board, and circuitry of a second printed circuit board is in board-to-board electrical connection with circuitry of the first printed circuit board. Board-to-board electrical connection between the first and second printed circuit boards is via a multi-wire ribbon connection. A housing houses the first and second printed circuit boards. The housing is configured for mounting at a vehicle and, with the vehicular camera module mounted at the vehicle, the camera has a field of view external of the vehicle. With the vehicular camera module mounted at the vehicle and responsive at least in part to processing by an image processor of image data captured by the image sensor, an object in the field of view of the camera is detected.

28 Claims, 18 Drawing Sheets

Related U.S. Application Data continuation of application No. 15/948,079, filed on Apr. 9, 2018, now Pat. No. 10,300,866, which is a continuation of application No. 15/488,714, filed on Apr. 17, 2017, now Pat. No. 9,937,876, which is a continuation of application No. 15/076,918, filed on Mar. 22, 2016, now Pat. No. 9,623,799, which is a continuation of application No. 14/658,275, filed on Mar. 16, 2015, now Pat. No. 9,296,339, which is a division of application No. 13/164,373, filed on Jun. 20, 2011, now Pat. No. 8,982,273, which is a continuation of application No. 10/534,632, filed as application No. PCT/US03/36177 on Nov. 14, 2003, now Pat. No. 7,965,336.

(60) Provisional application No. 60/492,544, filed on Aug. 5, 2003, provisional application No. 60/477,416, filed on Jun. 10, 2003, provisional application No. 60/426,239, filed on Nov. 14, 2002.

(51) Int. Cl.
| | | |
|---|---|---|
| *H04N 5/374* | (2011.01) | |
| *G03B 29/00* | (2021.01) | |
| *H04N 5/225* | (2006.01) | |
| *H04N 7/18* | (2006.01) | |
| *B60S 1/56* | (2006.01) | |
| *G03B 17/02* | (2021.01) | |
| *B60R 1/02* | (2006.01) | |
| *B60R 1/04* | (2006.01) | |
| *B60R 1/12* | (2006.01) | |
| *B60S 1/04* | (2006.01) | |
| *B60R 11/00* | (2006.01) | |
| *B60Q 1/14* | (2006.01) | |
| *G06K 9/00* | (2006.01) | |
| *H04N 5/33* | (2006.01) | |

(52) U.S. Cl.
CPC ............. *B60R 16/03* (2013.01); *B60S 1/0411* (2013.01); *B60S 1/56* (2013.01); *G03B 17/02* (2013.01); *G03B 29/00* (2013.01); *H04N 5/2252* (2013.01); *H04N 5/2253* (2013.01); *H04N 5/2254* (2013.01); *H04N 5/2257* (2013.01); *H04N 5/22521* (2018.08); *H04N 5/374* (2013.01); *H04N 7/183* (2013.01); *B60Q 1/1423* (2013.01); *B60R 2001/1215* (2013.01); *B60R 2011/004* (2013.01); *B60R 2011/008* (2013.01); *B60R 2011/0082* (2013.01); *B60R 2011/0084* (2013.01); *B60R 2011/0094* (2013.01); *B60R 2300/101* (2013.01); *B60R 2300/602* (2013.01); *B60R 2300/8046* (2013.01); *G06K 9/00791* (2013.01); *H04N 5/332* (2013.01)

(56) References Cited

U.S. PATENT DOCUMENTS

| | | |
|---|---|---|
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,371,659 A | 12/1994 | Pastrick et al. |
| 5,406,414 A | 4/1995 | O'Farrell et al. |
| 5,497,306 A | 3/1996 | Pastrick |
| 5,519,465 A | 5/1996 | Kawamura et al. |
| 5,525,264 A | 6/1996 | Cronin et al. |
| 5,550,677 A | 8/1996 | Schofield et al. |
| 5,567,360 A | 10/1996 | Varaprasad et al. |
| 5,592,255 A | 1/1997 | Wakabayashi et al. |
| 5,610,756 A | 3/1997 | Lynam et al. |
| 5,668,663 A | 9/1997 | Varaprasad et al. |
| 5,669,699 A | 9/1997 | Pastrick et al. |
| 5,670,935 A | 9/1997 | Schofield et al. |
| 5,724,187 A | 3/1998 | Varaprasad et al. |
| 5,760,962 A | 6/1998 | Schofield et al. |
| 5,796,094 A | 8/1998 | Schofield et al. |
| 5,798,575 A | 8/1998 | O'Farrell et al. |
| 5,823,654 A | 10/1998 | Pastrick et al. |
| 5,854,708 A | 12/1998 | Komatsu et al. |
| 5,872,332 A | 2/1999 | Verma |
| 5,877,897 A | 3/1999 | Schofield et al. |
| 5,910,854 A | 6/1999 | Varaprasad et al. |
| 5,949,331 A | 9/1999 | Schofield et al. |
| 5,978,017 A | 11/1999 | Tino |
| 6,002,511 A | 12/1999 | Varaprasad et al. |
| 6,013,372 A | 1/2000 | Hayakawa et al. |
| 6,071,606 A | 6/2000 | Yamazaki et al. |
| 6,072,814 A | 6/2000 | Ryan et al. |
| 6,080,101 A | 6/2000 | Tatsuno et al. |
| 6,097,023 A | 8/2000 | Schofield et al. |
| 6,151,065 A | 11/2000 | Steed |
| 6,154,306 A | 11/2000 | Varaprasad et al. |
| 6,172,613 B1 | 1/2001 | DeLine et al. |
| 6,176,602 B1 | 1/2001 | Pastrick et al. |
| 6,178,034 B1 | 1/2001 | Allemand et al. |
| 6,193,378 B1 | 2/2001 | Tonar et al. |
| 6,201,642 B1 | 3/2001 | Bos |
| 6,222,447 B1 | 4/2001 | Schofield et al. |
| 6,276,821 B1 | 8/2001 | Pastrick et al. |
| 6,302,545 B1 | 10/2001 | Schofield et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,483,101 B1 | 11/2002 | Webster |
| 6,498,620 B2 | 12/2002 | Schofield et al. |
| 6,523,964 B2 | 2/2003 | Schofield et al. |
| 6,535,242 B1 | 3/2003 | Strumolo et al. |
| 6,559,435 B2 | 5/2003 | Schofield et al. |
| 6,603,612 B2 | 8/2003 | Nakano |
| 6,611,202 B2 | 8/2003 | Schofield et al. |
| 6,690,268 B2 | 2/2004 | Schofield et al. |
| 6,717,610 B1 | 4/2004 | Bos et al. |
| 6,757,109 B2 | 6/2004 | Bos |
| 6,806,452 B2 | 10/2004 | Bos et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,946,978 B2 | 9/2005 | Schofield |
| 6,977,619 B2 | 12/2005 | March et al. |
| 7,004,606 B2 | 2/2006 | Schofield |
| 7,005,974 B2 | 2/2006 | McMahon et al. |
| 7,015,944 B2 | 3/2006 | Holz et al. |
| 7,038,577 B2 | 5/2006 | Pawlicki et al. |
| 7,095,123 B2 | 8/2006 | Prior |
| 7,123,168 B2 | 10/2006 | Schofield |
| 7,255,451 B2 | 8/2007 | McCabe et al. |
| 7,339,149 B1 | 3/2008 | Schofield et al. |
| 7,370,983 B2 | 5/2008 | DeWind et al. |
| 7,423,665 B2 | 9/2008 | Ray et al. |
| 7,453,509 B2 | 11/2008 | Losehand et al. |
| 7,965,336 B2 * | 6/2011 | Bingle .................... B60R 16/03 348/374 |
| 8,531,278 B2 | 9/2013 | DeWard et al. |
| 8,982,273 B2 * | 3/2015 | Bingle ................. H04N 5/2253 348/374 |
| 9,296,339 B2 | 3/2016 | Bingle et al. |
| 9,623,799 B2 * | 4/2017 | Bingle .................... H04N 5/374 |
| 9,937,876 B2 * | 4/2018 | Bingle .................... H04N 7/183 |
| 10,300,866 B2 * | 5/2019 | Bingle .................... B60S 1/0411 |
| 10,596,982 B2 | 3/2020 | Bingle et al. |
| 2002/0054266 A1 | 5/2002 | Nishimura |
| 2002/0159270 A1 | 10/2002 | Lynam et al. |
| 2002/0198632 A1 | 12/2002 | Breed et al. |
| 2003/0090569 A1 | 5/2003 | Poechmueller |
| 2003/0122930 A1 | 7/2003 | Schofield et al. |

(56) References Cited

U.S. PATENT DOCUMENTS

| | | |
|---|---|---|
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2005/0232469 A1 | 10/2005 | Schofield et al. |
| 2006/0038668 A1 | 2/2006 | DeWard et al. |
| 2006/0049533 A1 | 3/2006 | Kamoshita |
| 2006/0050018 A1 | 3/2006 | Hutzel et al. |
| 2006/0061008 A1 | 3/2006 | Karner et al. |
| 2006/0125919 A1 | 6/2006 | Camilleri et al. |
| 2006/0184297 A1 | 8/2006 | Higgins-Luthman |
| 2006/0209182 A1 | 9/2006 | Eriksson |
| 2007/0279518 A1 | 12/2007 | Apel et al. |
| 2008/0040004 A1 | 2/2008 | Breed |
| 2008/0043105 A1 | 2/2008 | Kallhammer et al. |
| 2009/0244361 A1 | 10/2009 | Gebauer et al. |
| 2011/0193961 A1 | 8/2011 | Peterson |

* cited by examiner

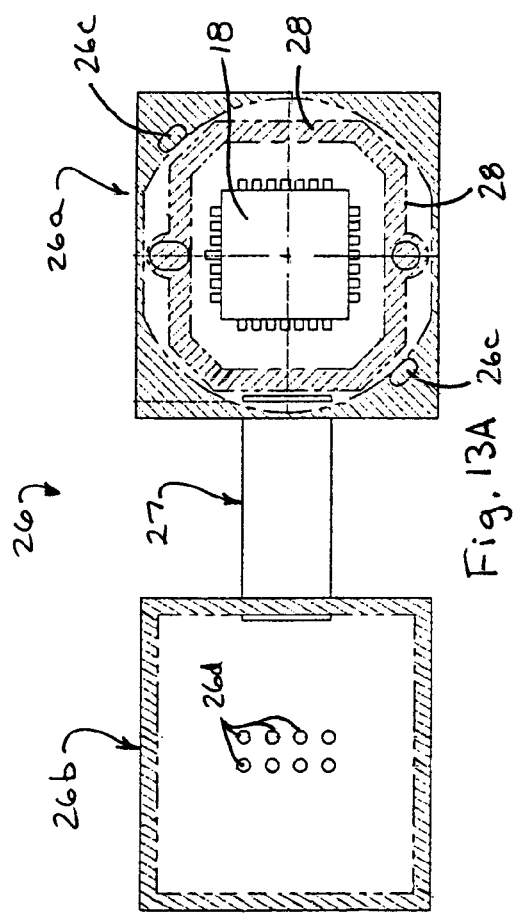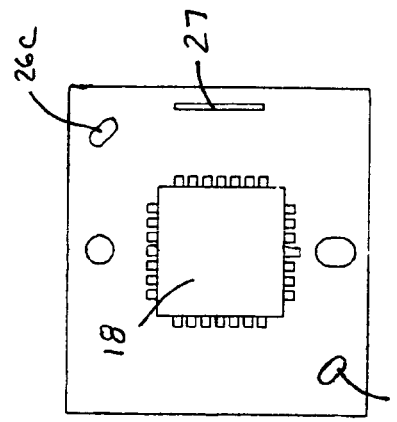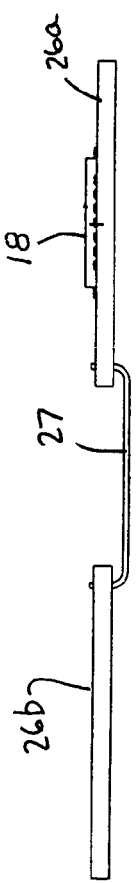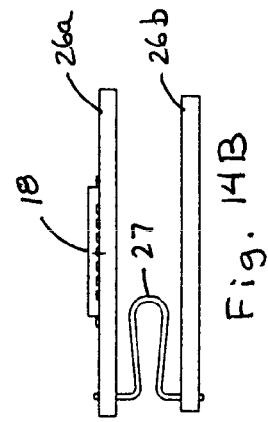

VEHICULAR CAMERA MODULE

CROSS REFERENCE TO RELATED APPLICATIONS

The present application is a continuation of U.S. patent application Ser. No. 16/413,703, filed May 16, 2019, now U.S. Pat. No. 10,596,982, which is a continuation of U.S. patent application Ser. No. 15/948,079, filed Apr. 9, 2018, now U.S. Pat. No. 10,300,866, which is a continuation of U.S. patent application Ser. No. 15/488,714, filed Apr. 17, 2017, now U.S. Pat. No. 9,937,876, which is a continuation of U.S. patent application Ser. No. 15/076,918, filed Mar. 22, 2016, now U.S. Pat. No. 9,623,799, which is a continuation of U.S. patent application Ser. No. 14/658,275, filed Mar. 16, 2015, now U.S. Pat. No. 9,296,339, which is a division of U.S. patent application Ser. No. 13/164,373, filed Jun. 20, 2011, now U.S. Pat. No. 8,982,273, which is a continuation of U.S. patent application Ser. No. 10/534,632, filed May 11, 2005, now U.S. Pat. No. 7,965,336, which is a 371 national phase application of PCT Application No. PCT/US2003/036177, filed Nov. 14, 2003, which claims priority of U.S. provisional applications, Ser. No. 60/492,544, filed Aug. 5, 2003, Ser. No. 60/477,416, filed Jun. 10, 2003, and Ser. No. 60/426,239, filed Nov. 14, 2002, which are all hereby incorporated herein by reference in their entireties.

FIELD OF THE INVENTION

The present invention relates to an imaging system for a vehicle and, more particularly, to a camera which may be mounted at an exterior portion of a vehicle for providing an image of a scene exteriorly of the vehicle. The present invention also relates to an imaging system for a vehicle which provides color imaging and a low light imaging capability.

BACKGROUND OF THE INVENTION

The advent of low cost, reliable imaging devices, based on a variety of silicon technologies, and in particular CMOS technology, combined with an improved cost/performance ratio for displays capable of meeting automotive specifications, and an increasing application rate of video monitor displays for automotive navigation systems or as part of the driver interface to a wide variety of vehicle systems, has led to an increasing use of cameras or imaging sensors designed to give the driver a view of those areas around the vehicle which are not in the normal direct field of view of the driver, typically referred to as "blind spots". These areas include the region close to the front of the vehicle, typically obscured by the forward structure of the vehicle, the region along the passenger side of the vehicle, the region along the driver's side of the vehicle rearward of the driver, and the area or region immediately rearward of the vehicle which cannot be seen directly or indirectly through the rear view mirror system. The camera or imaging sensor may capture an image of the rearward (or sideward or other blind spot area) field of view, and the image may be displayed to the driver of the vehicle to assist the driver in backing up or reversing or otherwise driving or maneuvering the vehicle. The use of electronic cameras in these applications significantly increases the driver's knowledge of the space immediately surrounding the vehicle, which may be of importance prior to and during low speed maneuvers, and thus contributes to the safe completion of such maneuvers.

It is thus known to provide a camera or imaging sensor on a vehicle for providing an image of a scene occurring exteriorly or interiorly of the vehicle to a driver of the vehicle. Such a camera may be positioned within a protective housing, which may be closed about the camera or sensor and secured together via fasteners or screws or the like. For example, a metallic protective housing may be provided, such as a die cast housing of aluminum or zinc or the like. In particular, for camera sensors mounted on the exterior of a vehicle, protection against environmental effects, such as rain, snow, road splash and/or the like, and physical protection, such as against road debris, dirt, dust, and/or the like, is important. Thus, for example, in known exterior camera sensor mounts, a butyl seal, such as a hot dispensed butyl seal, or an O-ring or other sealing member or material or the like, has been provided between the parts of the housing to assist in sealing the housing to prevent water or other contaminants from entering the housing and damaging the camera or sensor positioned therein. However, such housings typically do not provide a substantially water tight seal, and water droplets thus may enter the housing. Furthermore, any excessive vibration of the camera sensor, due to its placement (such as at the exterior of the vehicle), may lead to an undesirable instability of the image displayed to the driver of the vehicle. Also, such cameras or sensors are costly to manufacture and to implement on the vehicles.

Such vehicle vision systems often position a camera or imaging sensor at an exterior portion of a vehicle to capture an image of a scene occurring exteriorly of the vehicle. The cameras, particularly the cameras for rearward vision systems, are thus typically placed or mounted in a location that tends to get a high dirt buildup on the camera and/or lens of the camera, with no easy way of cleaning the camera and/or lens. In order to reduce the dirt or moisture buildup on the lenses of such cameras, it has been proposed to use hydrophilic or hydrophobic coatings on the lenses. However, the use of such a hydrophilic or hydrophobic coating on the lens is not typically effective due to the lack of air flow across the lens. It has also been proposed to use heating devices or elements to reduce moisture on the lenses. However, the use of a heated lens in such applications, while reducing condensation and misting on the lens, may promote the forming of a film on the lens due to contamination that may be present in the moisture or water. Also, the appearance of such cameras on the rearward portion of vehicles is often a problem for styling of the vehicle.

Typically, based on consumer preference and at least a perceived improved ability to extract information from the image, it is desired to present a color image to the driver that is representative of the exterior scene as perceived by normal human vision. It is also desirable that such imaging devices or systems be useful in all conditions, and particularly in all lighting conditions. However, it is often difficult to provide a color imaging sensor which is capable of providing a clear image in low light conditions. This is because conventional imaging systems typically have difficulty resolving scene information from background noise in low light conditions.

Silicon-based cameras may be responsive to light in the visible and near infrared portions of the spectrum. It is known to filter out the infrared portion of the energy available to the camera in order to maintain an appropriate color balance. When this is done, the camera sensitivity may be less than if the near infrared and infrared light was received and used by the camera. Depending on the imaging technology used, the minimum sensitivities currently economically available for automotive cameras are typically in the range of 1 to 2 lux and may maintain a reasonable image quality at light levels at or above such levels. However, the conditions on a dark cloudy night where moonlight is obscured, and/or in rural situations in which there is no source of artificial lighting, may result in a scene illumination as low as about 0.01 lux. While the technology continues to improve the low light sensitivity of silicon based cameras, it is not expected that 0.01 lux capability will become available in the foreseeable future. Other technologies may be capable of such sensitivity, but are not sufficiently cost effective for general application in the automotive industry.

Therefore, there is a need in the art for a camera housing that overcomes the shortcomings of the prior art, and a need in the art for an imaging system that may provide clear, satisfactory images during all driving or lighting conditions, and thus overcomes the shortcomings of the prior art imaging systems.

SUMMARY OF THE INVENTION

The present invention is intended to provide a camera module which includes a camera or image sensor and a circuit board positioned within a housing, which may be laser welded or sonic welded or the like to substantially seal the camera and circuit board within the housing. The housing, preferably molded of a plastic material, may include a plastic molded connector extending therefrom, such that the camera housing and connector are configured as a single unitary module. The camera module may include a heating element for heating a transparent cover at the lens (or for heating the lens itself) of the camera to assist in defogging or defrosting the transparent cover in cold weather conditions. The transparent cover may have a transparent conductive coating (such as an indium tin oxide (ITO) coating or doped tin oxide or a metal grid or the like), preferably on its inner surface, such that contact of a power terminal (connected to or in communication with or powered by a battery or other power source of the vehicle) and a ground terminal of the heating elements at the conductive coating causes heating of the coating to defrost or defog the cover. The heating elements or terminals may be actuated in response to a control or thermostat, which functions to activate and deactivate the heating element at predetermined temperatures sensed by a temperature sensor at or in the camera module or elsewhere at, in or on the vehicle. The present invention thus provides a camera module that maintains the camera or imaging sensor and is substantially impervious to environmental elements, such as rain, snow, dirt, dust, road splash, road debris and the like. The present invention also provides at least partial, and preferably substantial, reduced vibration effects of the camera or image sensor.

According to an aspect of the present invention, a substantially sealed camera module for an imaging system of a vehicle includes a plastic housing, which preferably includes first and second portions. The first and second portions are preferably laser welded or sonic welded together to substantially seal the camera or sensor and associated components within the plastic housing. The laser welded or sonic welded plastic housing provides a substantially hermetic seal to prevent water intrusion or the like into the housing. Alternately, and less preferably, the first and second portions may be adhesively sealed or joined.

The camera module may be incorporated into an imaging system that includes the sensor and a control for processing images captured by the imaging sensor. The camera module may be positioned within a movable housing that is movable relative to the vehicle to move the imaging sensor between an in use or operational position, where the imaging sensor is directed toward the exterior scene, and a storage position, where the housing and the imaging sensor are positioned within a portion of the vehicle.

According to another aspect of the present invention, a vented camera module for a vehicle includes a plastic housing which is configured to receive a camera or sensor therein. The housing of the vented camera module includes a semi-permeable ventilation area, such as a Gore-Tex assembly or area or patch or the like, which is at least partially permeable to water vapor and/or is porous enough to allow transfer of water vapor into and out from the housing, while substantially precluding entry of water droplets, dirt or the like into the housing.

According to another aspect of the present invention, a camera module for a vehicle includes a housing and a transparent cover at a portion of the housing. The transparent cover provides a transparent wall of the housing for the lens and sensor or camera to receive an image therethrough. The cover may be heated to defrost or defog the cover in cold weather conditions or the like. The cover includes a surface (such as an inner surface within the housing) which has a conductive coating, such as a coating of indium tin oxide (ITO), doped tin oxide or the like. The module includes a pair of heater terminals or elements which contact the coating, whereby heating of the cover or coating on the cover (such as the inner surface of the cover) is accomplished by generating a flow of electricity or electrons or current across the coating on the cover via the heater terminals or elements.

In one form, one of the heater terminals may be energized or charged with electricity and the other terminal may be grounded to the vehicle, such that the electrical current travels from the energized or powered terminal across the conductive coating to the grounded terminal, thereby heating the conductive coating and, thus, the transparent cover. Preferably, the heater terminals are spaced apart at generally opposite sides or portions of the transparent cover.

Actuation of the heater terminals may defrost or defog the transparent cover and/or may heat the module housing and interior compartment of the camera module to dry out any moisture within the housing or compartment. In applications where the module includes a ventilation area, such as a vented semi-permeable membrane, such as a Gore-Tex assembly or the like, heating of the compartment may be especially suited for driving moisture out of the compartment or module through the ventilation area to limit or substantially preclude moisture condensing within the module. Optionally, the heater terminals may be actuated or energized in response to a control, which is operable to energize the heater terminals or elements in response to a thermostat and/or temperature sensor positioned at or within the camera module or elsewhere at, in or on the vehicle. Optionally, desiccant material, such as silica gel or the like, may be included in the housing to absorb moisture which may be present within the housing.

According to yet another aspect of the present invention, a camera module for a vehicle comprises a housing, a transparent cover at a portion of the housing, an image sensor, at least one heating element and a control. The image sensor is positioned within the housing and is operable to receive an image of a scene exteriorly of the housing through the transparent cover. The heating element is operable to heat the transparent cover. The control is operable to activate the heating element in response to a temperature sensor. The heating element is activatable to heat the transparent cover to reduce fog and/or ice on the transparent cover.

The present invention also provides a camera housing that is movably positioned at an exterior portion of a vehicle such that the camera may be moved from a stored position to an in-use or exterior or operational position. The camera housing may include a transparent window or panel and may further include a window wiper that functions to wipe dirt and/or moisture or the like from the window or panel as the housing moves the camera between the stored position and the operational position.

According to an aspect of the present invention, a holding device for movably holding an imaging device of a vehicle includes a housing, a transparent panel and a panel cleaning device. The imaging device is operable to capture an image of a scene occurring exteriorly of the vehicle. The housing is movably mountable at an exterior portion of the vehicle and is configured to receive an imaging device therein. The housing is movable relative to the exterior portion of the vehicle to move the imaging device between a stored position, where the imaging device is positioned generally within the portion of the vehicle, and an operational position, where the imaging device is positioned to have a field of view exteriorly of the vehicle. The transparent panel is positioned at least partially across an opening of the housing and generally in the field of view of the imaging device. The panel cleaning device is positionable at the exterior portion of the vehicle and configured to engage the transparent panel to clean the transparent panel as the housing moves the imaging device between the stored position and the operational position.

According to another aspect of the present invention, an imaging system for a vehicle includes an imaging device operable to capture an image of a scene occurring exteriorly of a vehicle, a control operable to process the image captured by the imaging device, and a camera housing device. The housing device includes a housing portion defining a compartment, a transparent panel substantially closing an opening of the compartment, and a panel cleaning device. The housing device is movably mountable on an exterior portion of the vehicle. The imaging device is positioned within the compartment and directed toward the transparent panel. The housing device is movable between a stored position, where the imaging device and the transparent panel are positioned at least substantially within the exterior portion of the vehicle, and an operational position, where the imaging device is directed exteriorly of the vehicle and has a field of view directed through the transparent panel and toward the exterior scene. The panel cleaning device is positionable at the exterior portion of the vehicle and configured to engage the transparent panel to clean the transparent panel as the housing device moves between the stored position and the operational position.

The imaging system may include a display operable to display the image captured by the imaging device. The housing device may be pivotably mountable at the exterior portion of the vehicle, or the housing device may be slidably or otherwise movably mountable at the exterior portion of the vehicle. An outer panel of the housing device may define an exterior cover portion at the exterior portion of the vehicle when the housing device is moved or pivoted to the stored position.

Optionally, the imaging system may comprise a color imaging sensor operable to capture color images of the exterior scene and an infrared imaging sensor operable to capture infrared images of the exterior scene. The control may selectively activate one of the color imaging sensor and the infrared imaging sensor in response to the ambient light intensity present in the exterior scene.

Optionally, the imaging system may include an illumination source positioned within the compartment and directed toward the exterior scene when the housing device is moved to the operational position. The transparent panel and the compartment are positioned generally within the exterior portion of the vehicle when the housing device is moved to the stored position. Optionally, the control may be operable to selectively activate the illumination source and the imaging device when the housing device is moved to the stored position to determine if moisture is present on the transparent panel. The housing device may include a heater element that is selectively operable to heat the transparent panel to reduce moisture present on the transparent panel.

Optionally, the housing device may be movable to selectively position the imaging device in first and second operational positions. The control may be operable to determine a distance to at least one object in the exterior scene in response to processing of images captured by the imaging device when the imaging device is in the first and second operational positions. For example, the control may be operable to selectively move the housing device to position the imaging device at the first operational position in response to the vehicle making an initial approach to a target zone and to position the imaging device at the second operational position in response to the vehicle moving further into the target zone. The imaging device may be directed more downward when in the second operational position relative to the first operational position.

According to another aspect of the present invention, an imaging system of a vehicle includes an imaging device, a holding device and a control. The imaging device is operable to capture images of a scene occurring exteriorly of the vehicle. The holding device is pivotally mountable at a portion of a vehicle and includes a housing having an exterior panel and a transparent panel. The imaging device is positioned within the housing. The transparent panel is positioned at least partially across an opening of the housing and generally in the field of view of the imaging device. The holding device is pivotable relative to the portion of the vehicle to move the imaging device between a stored position, where the imaging device is positioned generally within the portion of the vehicle, and an operational position, where the imaging device is positioned to have a field of view exteriorly of the vehicle. The exterior panel is generally aligned with an exterior surface of the portion of the vehicle and the transparent panel is generally within the portion of the vehicle when the imaging device is in the stored position. The control is operable to process images captured by the imaging device.

The present invention also provides a vehicular imaging system or image capture system which is operable to capture an image of an exterior scene and to display the images at a display of the vehicle. The imaging system is operable to control illumination sources operable to illuminate the exterior scene and/or to control the color processing of the captured images and/or to control the color/monochromatic status or mode of the image capture device or camera of the system, in order to provide or display an optimum color or black and white image at the display which has optimum color representation of the scene or has optimum illumination or visibility or clarity or contrast ratio in the image displayed.

For example, the imaging system may selectively activate visible or infrared or near infrared illumination sources or light emitting diodes (LEDs) in response to a detected ambient light level dropping or decreasing or lowering to a threshold level. The imaging system may also or otherwise selectively switch the imaging sensor from a color mode to a black and white mode in response to the reduced ambient light level. Optionally, the imaging system may apply an infrared contribution correction to the detected levels for each color (such as red, green, blue) detected by the imaging sensor to adjust the color balance of the imaging sensor for better color rendition in the captured images. Optionally, the imaging system may provide visible illumination to the exterior scene and may limit or block infrared and near infrared light present in the illuminated scene to reduce processing requirements to obtain the appropriate color balance in the captured images.

Therefore, the present invention provides a camera module for a vehicle which may be substantially hermetically sealed to limit or substantially preclude water intrusion or the like into the housing of the module, or which may be vented to allow for water vapor to enter or exit the module. The camera housing may also include a heating element which is operable to defrost or defog the transparent cover of the module and/or to heat the compartment of the camera housing to limit or substantially preclude condensation from forming within the module. The heating element may be activated and deactivated at predetermined temperatures in response to a temperature sensor and/or thermostat. The transparent cover of the housing may include a conductive coating on a surface thereof, such that applying an electrical current or flow through or across the coating on the surface of the transparent cover functions to heat the surface of the cover to defrost or defog the transparent cover. The present invention thus provides an environmentally resilient, protected, economical camera module which may be mounted to a vehicle and connected or plugged into a wiring connector of the vehicle.

The present invention thus also provides a camera housing device that is movable or adjustable to move a camera or imaging sensor between an operational position and a stored position. The camera thus may be positioned in a stored position within an exterior portion of the vehicle when not in use. The exterior panel of the camera housing device may provide an exterior cover at the exterior portion of the vehicle to protect the camera and lens from the elements when they are not in use. The housing device may include a transparent panel that substantially encloses the camera and lens within the housing. The housing device may also include a panel cleaning device that may clean the transparent panel to limit or substantially preclude dirt buildup or debris on the panel that may adversely affect the performance of the camera and thus of the imaging system.

The present invention also provides an imaging system that is capable of providing a color image during daytime conditions, and that may provide a black and white image, with or without additional infrared or near infrared illumination provided to the scene, during darkened or nighttime conditions. The imaging system may correct the color image to account for infrared and near infrared illumination that may be present in the exterior scene, in order to provide an image with proper or desired color balance. The present invention thus may provide optimal images to the driver of the vehicle during substantially all types of lighting conditions.

These and other objects, purposes, advantages and features of the present invention will become apparent upon review of the following specification in conjunction with the drawings.

BRIEF DESCRIPTION OF THE DRAWINGS

FIG. 13A is a top plan view of a circuit board useful with the camera module of the present invention;

FIG. 13B is a side elevation of the circuit board of FIG. 13A;

FIG. 14A is another plan view of the circuit board of FIGS. 13A and 13B, with the circuit board folded over itself;

FIG. 14B is a side elevation of the circuit board of FIG. 14A;

DESCRIPTION OF THE PREFERRED EMBODIMENTS

Figure 1:
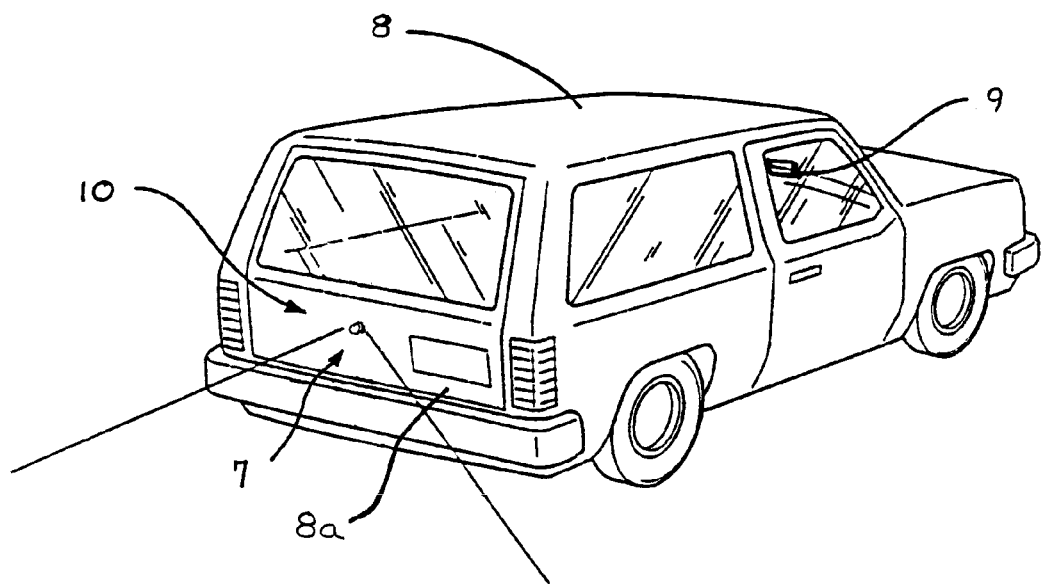
FIG. 1 is a rear perspective view of a vehicle having an imaging system thereon in accordance with the present invention.
Figure 2:
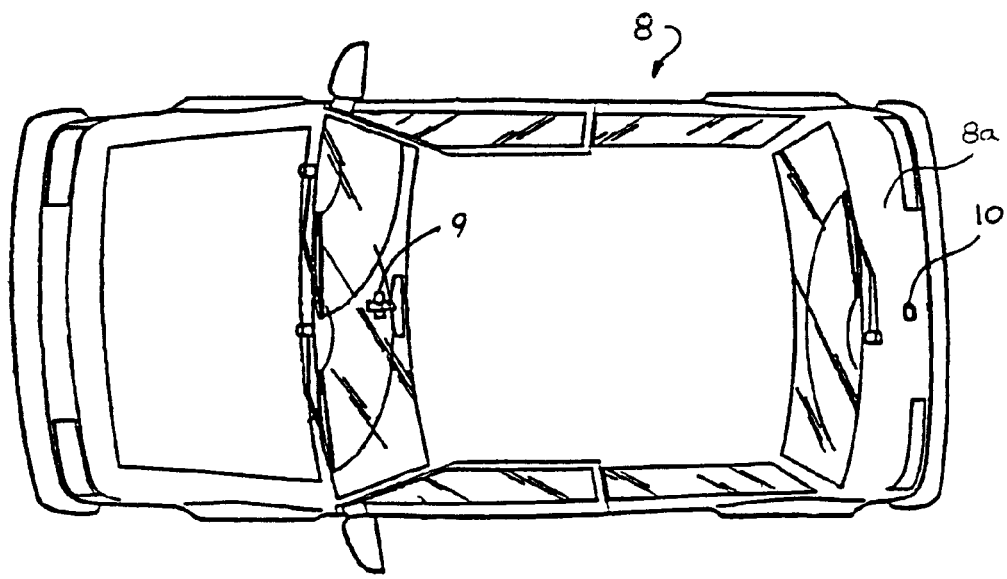
FIG. 2 is a plan view of the vehicle of FIG. 1.
Figure 3:
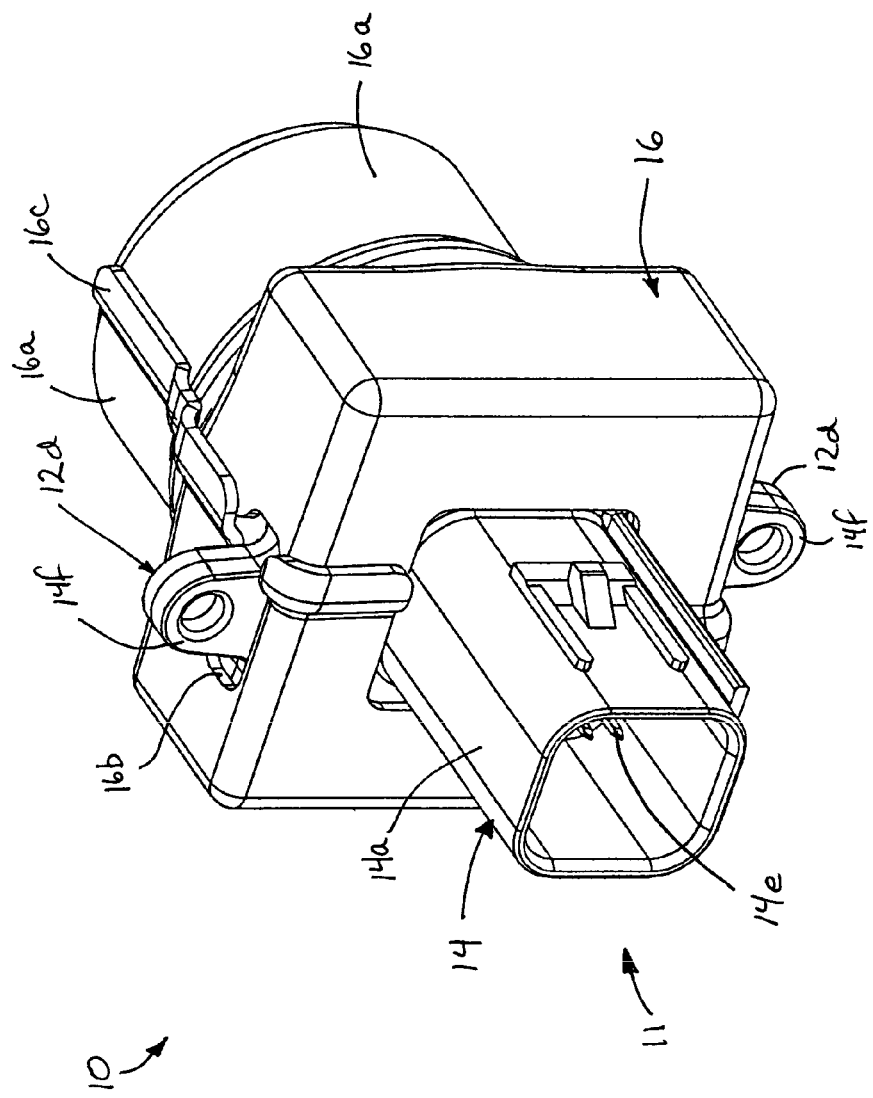
FIG. 3 is a perspective view of a camera module in accordance with the present invention.
Figure 4:
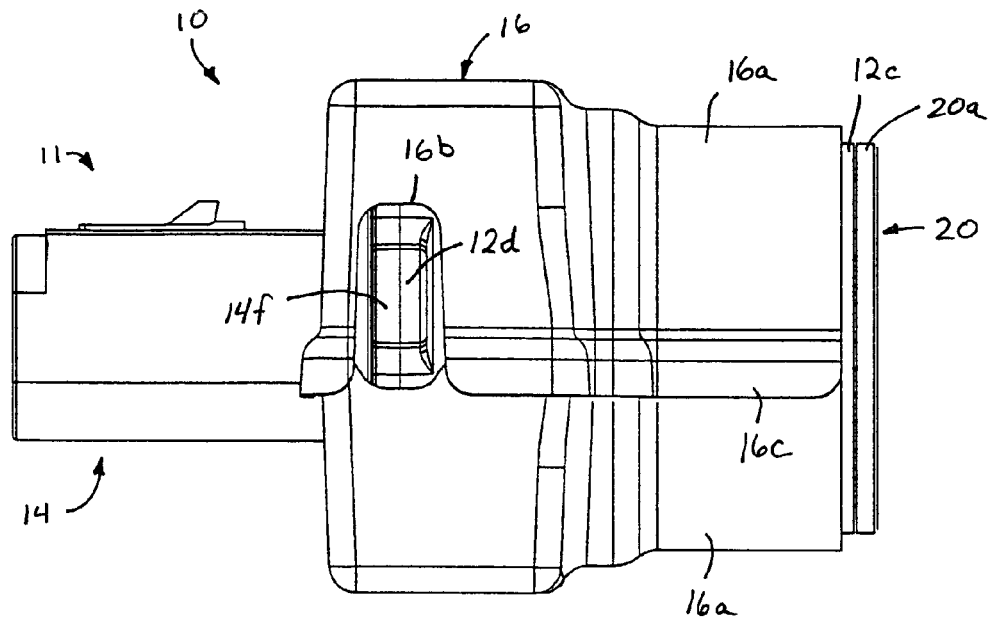
FIG. 4 is a side elevation of the camera module of FIG. 3.
Figure 5:
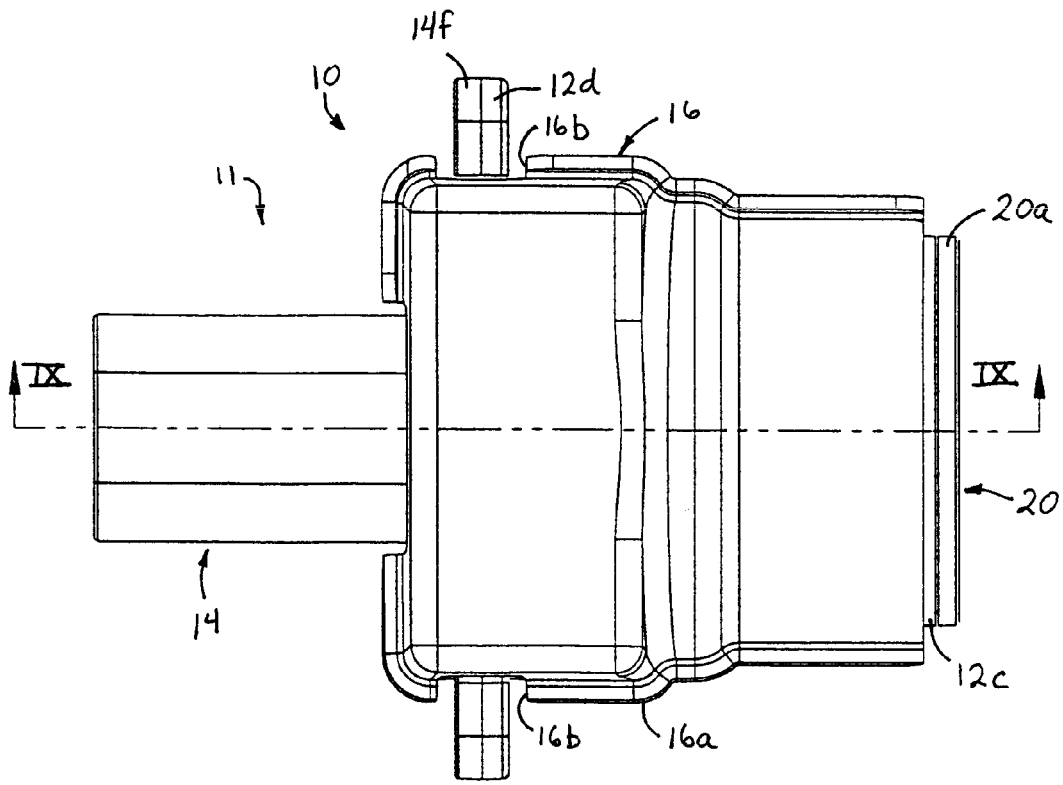
FIG. 5 is another side elevation of the camera module of FIGS. 3 and 4.
Figure 6:
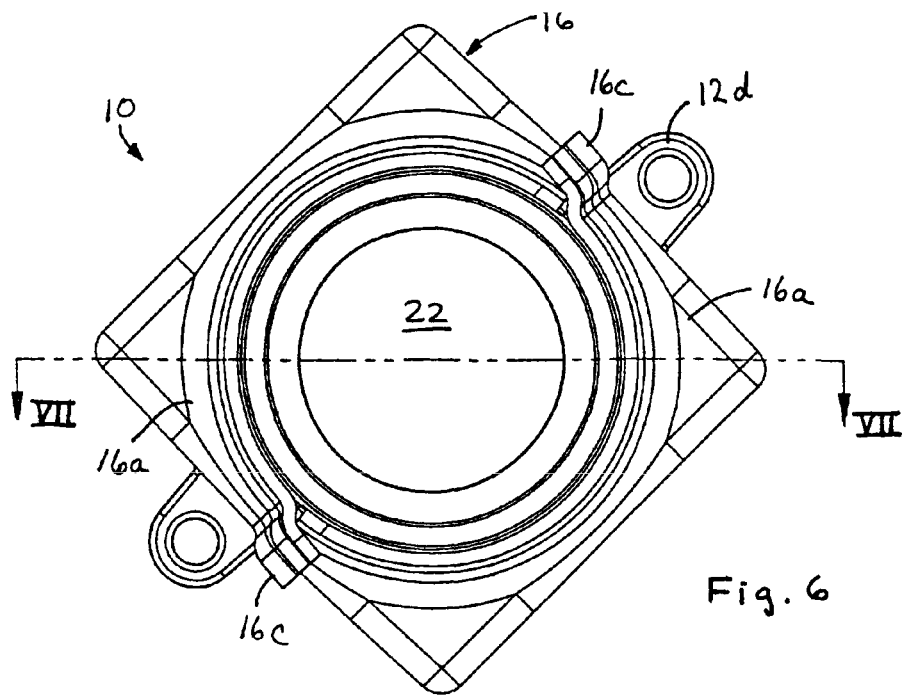
FIG. 6 is an end elevation of the camera module of FIGS. 3-5.

Referring now to the drawings and the illustrative embodiments depicted therein, an image capture system or imaging or vision system 7 is positioned at a vehicle 8, such as at a rearward exterior portion 8a of the vehicle 8, and is operable to capture an image of a scene occurring interiorly or exteriorly of the vehicle, such as rearwardly of the vehicle, and to display the image at a display or display system 9a of the vehicle which is viewable by a driver or occupant of the vehicle (FIGS. 1 and 2). Imaging system 7 includes a camera module 10, which is mountable on, at or in the vehicle to receive an image of a scene occurring exteriorly or interiorly of the vehicle, and a control 9b that is operable to process images captured by an image sensor 18 of camera module 10. Camera module 10 includes a plastic camera housing 11 and a metallic protective shield or casing 16 (FIGS. 3-12). Camera housing 11 includes a camera housing portion 12 and a connector portion 14, which mate or join together and are preferably laser welded or sonic welded together to substantially seal the housing 11 to substantially limit or prevent water intrusion or other contaminants from entering the housing, as discussed below.

Housing 11 of camera module 10 substantially encases a camera or image sensor or sensing device 18 (FIGS. 7, 9-11, 13A, 13B, 14A and 14B), which is operable to capture an image of the scene occurring exteriorly or interiorly of the vehicle, depending on the particular application of camera module 10. Housing 11 also includes a cover portion 20 at an end of camera housing portion 12. Cover portion 20 provides a transparent cover plate 22 which allows the image of the scene exteriorly or interiorly of the vehicle to pass therethrough and into housing 11 to camera 18, and which may be heated to defrost or defog the cover, as discussed below. Camera module 10 may include the protective shield 16, which substantially encases camera housing portion 12 and a portion of connector portion 14, thereby substantially limiting or reducing electronic noise going into or out of the camera module and/or protecting the plastic housing 11 from damage due to impact or the like with various items or debris that may be encountered at the exterior of the vehicle.

Camera module 10 provides a camera or image capture device 18 for capturing an image of a scene occurring exteriorly or interiorly of a vehicle. The captured image may be communicated to a display or display system 9a which is operable to display the image to a driver of the vehicle. The camera or imaging sensor 18 useful with the present invention may comprise an imaging array sensor, such as a CMOS sensor or a CCD sensor or the like, such as disclosed in commonly assigned U.S. Pat. Nos. 5,550,677; 5,670,935; 5,796,094 and 6,097,023, and U.S. patent application Ser. No. 09/441,341, filed Nov. 16, 1999, now U.S. Pat. No. 7,339,149, which are hereby incorporated herein by reference. Camera module 10 and imaging sensor 18 may be implemented and operated in connection with various vehicular vision systems, and/or may be operable utilizing the principles of such other vehicular systems, such as a vehicle headlamp control system, such as the type disclosed in U.S. Pat. Nos. 5,796,094; 6,097,023; 6,320,176 and 6,559,435, and U.S. patent application Ser. No. 09/441,341, filed Nov. 16, 1999, now U.S. Pat. No. 7,339,149; and Ser. No. 10/427,146, filed Apr. 30, 2003, now U.S. Pat. No. 6,831,261, which are all hereby incorporated herein by reference, a rain sensor, such as the types disclosed in commonly assigned U.S. Pat. Nos. 6,353,392; 6,313,454 and/or 6,320,176, which are hereby incorporated herein by reference, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202 and 6,201,642, and/or in U.S. patent application Ser. No. 09/199,907, filed Nov. 25, 1998, now U.S. Pat. No. 6,717,610; Ser. No. 10/372,873, filed Feb. 24, 2003, now U.S. Pat. No. 6,802,617; Ser. No. 10/011,517, filed Nov. 5, 2001, now U.S. Pat. No. 6,806,452; Ser. No. 10/324,679, filed Dec. 20, 2002, now U.S. Pat. No. 6,891,563; Ser. No. 10/047,901, filed Jan. 14, 2002, now U.S. Pat. No. 6,822,563; Ser. No. 10/643,602, filed Aug. 19, 2003, now U.S. Pat. No. 7,859,565; and Ser. No. 10/010,862, filed Dec. 6, 2001, now U.S. Pat. No. 6,757,109, which are all hereby incorporated herein by reference, a trailer hitching aid or tow check system, such as the type disclosed in U.S. patent application Ser. No. 10/418,486, filed Apr. 18, 2003, now U.S. Pat. No. 7,005,974, which is hereby incorporated herein by reference, a reverse or sideward imaging system, such as for a lane change assistance system or lane departure warning system, such as the type disclosed in U.S. patent application Ser. No. 10/427,051, filed Apr. 30, 2003, now U.S. Pat. No. 7,038,577, which is hereby incorporated herein by reference, a traffic sign recognition system, a system for determining a distance to a leading or trailing vehicle or object, such as a system utilizing the principles disclosed in U.S. Pat. No. 6,396,397, which is hereby incorporated herein by reference, and/or the like.

Typically, cameras are best suited for uniform lighting conditions, and typically have a dynamic range of approximately 60 to 70 dB. The lighting extremes which are encountered in automotive applications create challenges for these cameras. For example, a single frame captured by the camera may include sunlight reflecting off concrete pavement and a dark shadow cast by the vehicle or other object. In such a situation, standard dynamic range cameras are limited in their ability to display usable images in both portions of the frame. Either the light area may be washed out, or the shadowed area may be black or darkened.

Optionally, and preferably, camera 18 may comprise an extended dynamic range camera, which may have a dynamic range of greater than approximately 100 dB, and preferably approximately 100 to 120 dB. The linear dynamic range of the camera or sensor may be extended to above 100 dB by programming a non-linear response curve that generally matches the response of the human eye. By providing such an extended dynamic range camera, the camera module may provide an image which is readable and not washed out or darkened in both the highly lighted areas and the dark areas of each frame of the image captured by the camera. Such a camera thus may provide an image to the display or display system which is readable in both the light and dark regions of each frame.

In a preferred embodiment, the extended dynamic range camera may provide a dynamic range of approximately 62 dB in a linear mode and approximately 110 dB in a non-linear mode. The camera or sensor may have a sensitivity of approximately 5 V/lux·s (if the sensor comprises a monochrome sensor) or approximately 2.7 V/lux·s (if the sensor comprises a color sensor), and may be operable at a frame rate of approximately 30 frames per second. For example, the camera or sensor may comprise a LM9618 Monochrome CMOS Image Sensor or a LM9628 Color CMOS Image Sensor, both of which are commercially available from National Semiconductor. Other suitable cameras or sensors may otherwise be implemented with the camera module, without affecting the scope of the present invention.

Although shown at a rear portion of a vehicle, camera 18 and camera module 10 may be positioned at any suitable location on the vehicle, such as within a rear panel or portion of the vehicle, a side panel or portion of the vehicle, a license plate mounting area of the vehicle, an exterior mirror assembly of the vehicle, an interior rearview mirror assembly of the vehicle or any other location where the camera may be positioned and oriented to provide the desired view of the scene occurring exteriorly or interiorly of the vehicle. The camera module of the present invention is particularly suited for use as an exterior camera module. However, the camera module may be positioned at an interior portion of the vehicle, such as at or in an interior rearview mirror assembly or accessory module at or near an interior rearview mirror assembly, to provide an image of an interior scene or of an exterior scene through a window or windshield of the vehicle, without affecting the scope of the present invention. The image captured by the camera may be displayed at a display screen or the like positioned within the cabin of the vehicle, such as at an interior rearview mirror assembly (such as disclosed in U.S. patent application Ser. No. 09/793,002, filed Feb. 26, 2001, now U.S. Pat. No. 6,690,268, which is hereby incorporated herein by reference), or elsewhere at or within the vehicle cabin, such as by using the principles disclosed in U.S. Pat. Nos. 5,550,677; 5,670,935; 5,796,094; 6,097,023 and 6,201,642, and/or in U.S. patent application Ser. No. 09/199,907, filed Nov. 25, 1998, now U.S. Pat. No. 6,717,610, which are hereby incorporated herein by reference.

As best shown in FIGS. 7 and 9-12, camera housing portion 12 includes a generally cylindrical portion 12a extending outwardly from a base portion 12b. Camera portion 12 comprises a molded plastic component and may include a pair of heater terminals or elements 30a, 30b insert molded within and/or along the walls of cylindrical portion 12a, as discussed below. Cylindrical portion 12a receives a lens or optic system 24 therein, which functions to focus the image onto camera or sensor 18, which is positioned at a circuit board 26 mounted within the base portion 12b of camera housing portion 12.

Lens system 24 is positioned within cylindrical portion 12a of camera portion 12 so as to receive light from the exterior or interior scene through cover 22 at end 12c of camera portion 12. Lens system 24 is mounted to, such as via threaded engagement with, camera cover or housing 28, which functions to substantially cover or encase camera or sensor 18 to substantially prevent or limit incident light from being received by camera 18 and interfering with the image received by camera 18 through cover 22 and lens system 24. The lens system 24 may be any small lens or lens system which may focus an image of the scene exteriorly of the camera module onto the camera or image sensor 18, such as, for example, the types disclosed in U.S. Pat. No. 6,201,642 and/or in U.S. patent application Ser. No. 10/010,862, filed Dec. 6, 2001, now U.S. Pat. No. 6,757,109, which are hereby incorporated herein by reference. The lens system 24 may provide a wide-angle field of view, such as approximately 120 degrees or more.

Cover portion 20 is mounted at an outer end 12c of camera housing portion 12 opposite from base portion 12b, as shown in FIGS. 7 and 9-11. Cover portion 20 includes an outer circumferential ring or cover retainer 20a, which engages an outer surface of transparent cover 22 and functions to retain transparent cover 22 in position at the end 12c of the cylindrical portion 12a of camera receiving portion 12. Preferably, circumferential ring 20a is laser welded or sonic welded or otherwise joined or bonded to outer end 12c of cylindrical portion 12a of camera receiving portion 12, as discussed below. The laser or sonic welding of the seam substantially seals and secures cover portion 20 onto camera receiving portion 12, and may limit or substantially preclude any water intrusion or contaminant intrusion into the camera receiving portion at the outer end 12c. Preferably, an inner surface 22a of transparent cover 22 includes a transparent conductive coating for heating the cover, as also discussed below.

In the illustrated embodiment, base portion 12b is generally square and defines a generally square mating edge 12e around the base portion 12b for mating and securing to a corresponding edge 14g of connector portion 14, as discussed below. Base portion 12b receives circuit board 26 and camera 18 therein, while a camera housing or shield 28 and lens or lens system 24 extend into cylindrical portion 12a of camera portion 12 to receive the image through transparent cover 22.

Connector portion 14 of housing 11 is a molded plastic component and includes a connector terminal or connector 14a, such as a multi-pin snap-on connector or the like, extending from a base portion 14b. Base portion 14b is formed (such as in a square shape as shown in the illustrated embodiment) to substantially and uniformly mate or connect to base portion 12b of camera housing 12, as can be seen with reference to FIGS. 7 and 9-11. The base portions 12b and 14b mate together and define a pocket or space for receiving and securing circuit board 26 therein. Base portions 14b and 12b may be laser welded or sonic welded together at their mating joint or connection 13. Laser or sonic welding of the joint melts the plastic edges or seams together to substantially hermetically seal housing 11 to prevent water intrusion or other contaminant intrusion into housing 11 of camera module 10. Optionally, and less desirably, the base portions may be otherwise joined or substantially sealed together (such as via suitable adhesives and/or sealants). The module may optionally include a vented portion or semi-permeable membrane to vent the module, as discussed below. The base portions 12b and 14b may further include mounting tabs or flanges 12d, 14f, which extend outwardly from base portion 12b, 14b. Mounting tabs 12d, 14f are generally aligned with one another when the base portions are secured together and include an aperture therethrough for mounting the camera module 10 at or to the vehicle via suitable fasteners or the like (not shown). Although shown as having generally square-shaped mating portions, connector portion 14 and camera portion 12 may have other shaped mating portions or surfaces, without affecting the scope of the present invention.

Figure 15C:
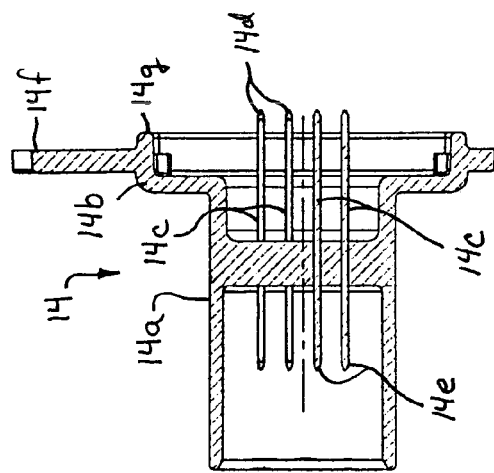
FIG. 15C is a sectional view of the connector portion taken along the line C-C in FIG. 15B.
Figure 15B:
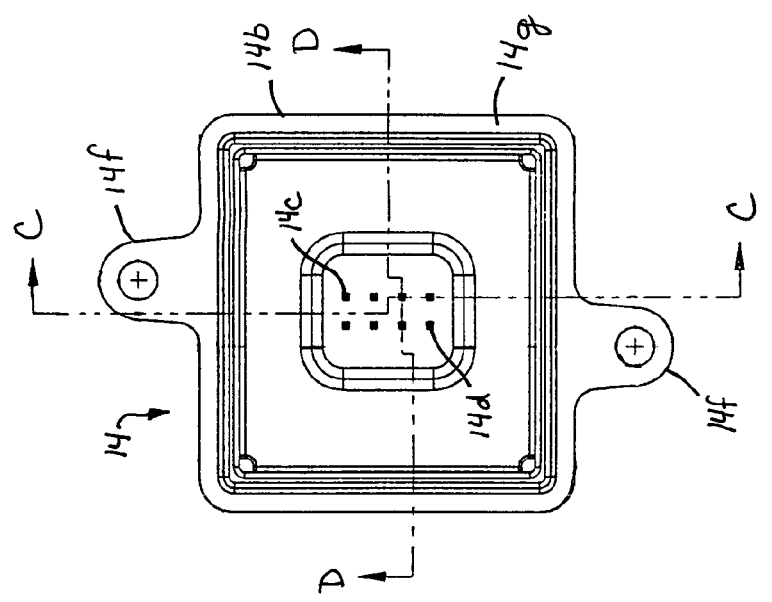
FIG. 15B is an end elevation of the connector portion of FIG. 15A.
Figure 15A:
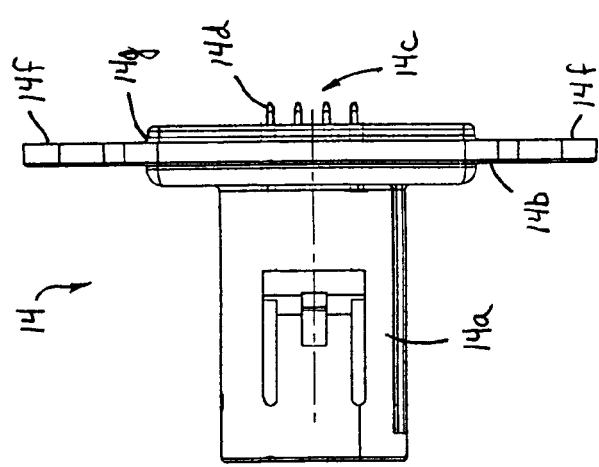
FIG. 15A is a side elevation of a connector portion of the camera module of the present invention.
Figure 15E:
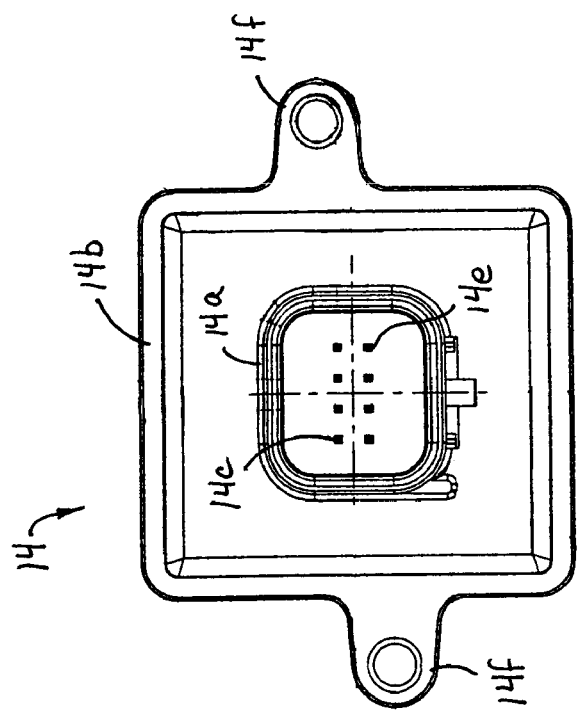
FIG. 15E is an opposite end elevation of FIG. 15B of the connector portion of FIGS. 15A-D.
Figure 15D:
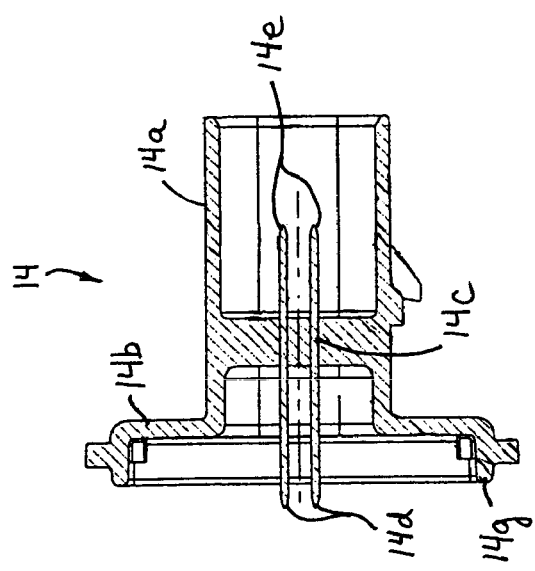
FIG. 15D is another sectional view of the connector portion taken along the line D-D in FIG. 15B.
Figure 16B:
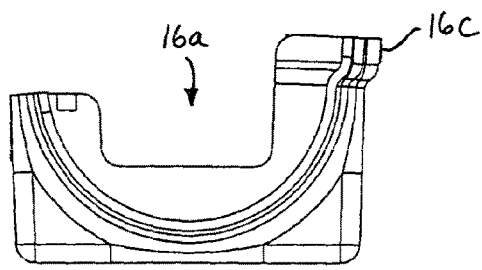
FIGS. 16A-D are various views of one side or portion of a metallic protective shield for the camera module of the present invention.
Figure 16A:
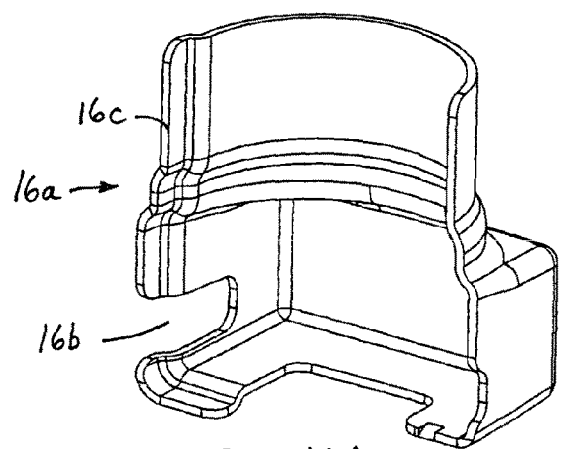
Figure 16D:
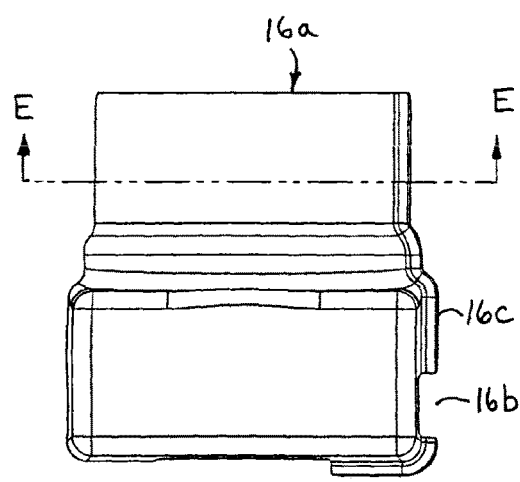
Figure 16C:
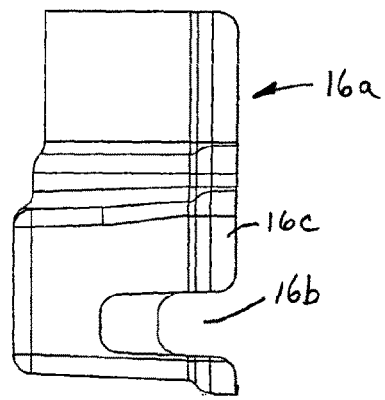
Figure 16E:
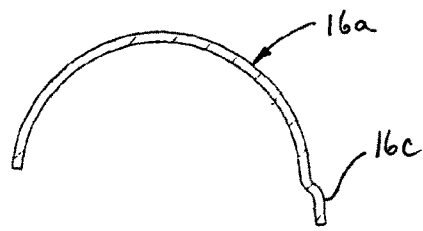
FIG. 16E is a sectional view of the protective shield taken along the line E-E in FIG. 16D.
Figure 17A:
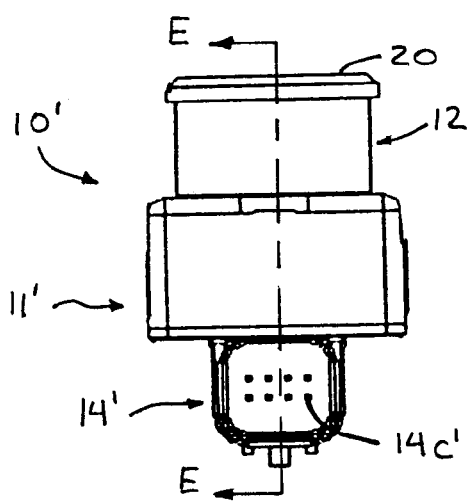
FIGS. 17A and 17B are side elevations of an alternate embodiment of another camera module and/or components thereof in accordance with the present invention, with the connector portion being angled.
Figure 17B:
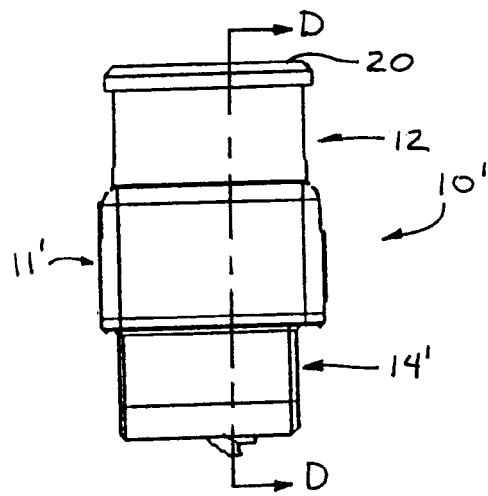
Figure 17C:
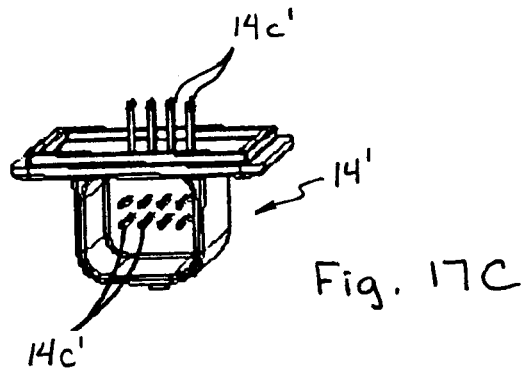
FIG. 17C is a perspective view of the connector portion of the camera module of FIGS. 17A and 17B.
Figure 17D:
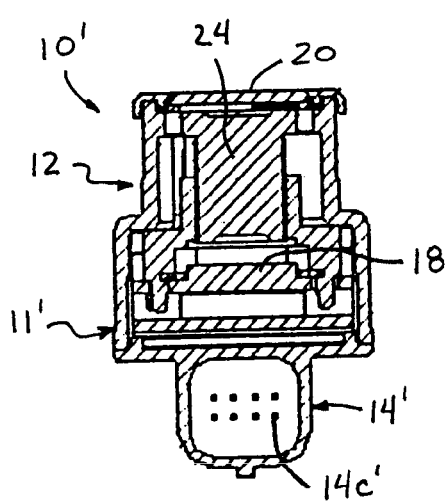
FIG. 17D is a sectional view of the camera module taken along the line D-D in FIG. 17B.
Figure 17E:
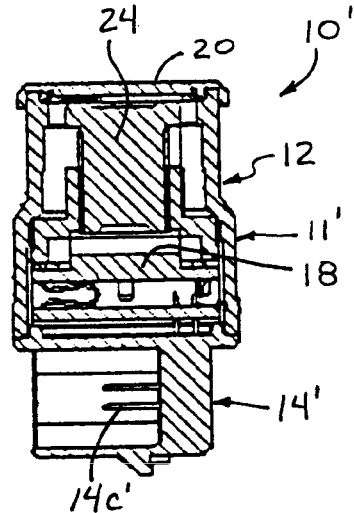
FIG. 17E is a sectional view of the camera module taken along the line E-E in FIG. 17A.

Multi-pin connector 14a extends from base portion 14b and includes a plurality of pins or terminals 14c for electrically connecting camera module 10 with a connector (not shown) of the vehicle. For example, one end 14d of terminals 14c may connect to circuit board 26, while the other end 14e of terminals 14c connects to the corresponding connector of the vehicle. The corresponding connector may partially receive the ends 14e of pins or terminals 14c at multi-pin connector 14a and may snap together with multi-pin connector 14a via a snap connection or the like. As best shown in FIGS. 15A, 15C and 15D, ends 14d of terminals 14c protrude or extend from connector portion 14, such that the ends 14d may be received within corresponding openings or apertures 26c in circuit board 26 when housing portion 11 is assembled, as discussed below.

As shown in FIGS. 3-11, connector portion 14 may provide a generally straight multi-pin connector extending longitudinally from the base portion of the housing 11. However, other shapes of connectors, such as angled connectors or bent connectors or the like, such as a 90 degree angle connector portion 14' of a camera module 10' (FIGS. 17A-E), discussed below, may be implemented, depending on the particular application of the camera module, without affecting the scope of the present invention.

Optionally, camera module 10 may comprise a substantially hermetically sealed module, such that water intrusion into the module is limited or substantially precluded. Base portion 12b of camera housing portion 12 and base portion 14b of connector portion 14 are correspondingly formed so as to substantially mate or join together at their mating seam 13, whereby the portions may be laser welded or sonic welded together or otherwise joined, while cover portion 20 is also laser welded or sonic welded or otherwise secured and substantially sealed at the opposite end 12c of camera portion 12, in order to substantially seal the camera housing. Laser or sonic welding techniques are preferred so as to join the materials at a state where they are able to re-flow, either via heat, vibration or other means, such that the materials re-flow and cross-link and become a unitary part. Such joining results in a substantially hermetically sealed camera module. Additionally, the pores in the plastic as well as any voids around the insert molded pins and stampings may be sealed with a Loctite material or other suitable sealing material, to further limit or substantially preclude entry of water droplets and/or water vapor into the housing of the substantially sealed module.

Optionally, or alternately, the camera module of the present invention may comprise a vented module, which allows for water vapor to enter and/or exit the housing, while substantially precluding water droplets and the like from entering the housing. The camera portion 12 or connector portion 14 may include a semi-permeable ventilation portion or membrane 15 (FIG. 10), which preferably comprises a material or membrane which is at least partially permeable to water vapor and/or is porous enough to allow for ventilation of water vapor, but does not allow water droplets to pass therethrough, such that water vapor may enter and exit the housing 11, while water droplets and the like are kept outside the housing 11. For example, the ventilation portion 15 may comprise a Gore-Tex material or the like. In such applications where the module comprises a vented module and includes a ventilation portion, it is not necessary that the seams of the housing be laser welded or sonic welded, since the substantially hermetic sealing of the seams of the module would not be critical when the module is vented. Optionally, desiccant material, such as silica gel or the like, may be included in the housing to absorb moisture which may be present within the housing.

Figure 7:
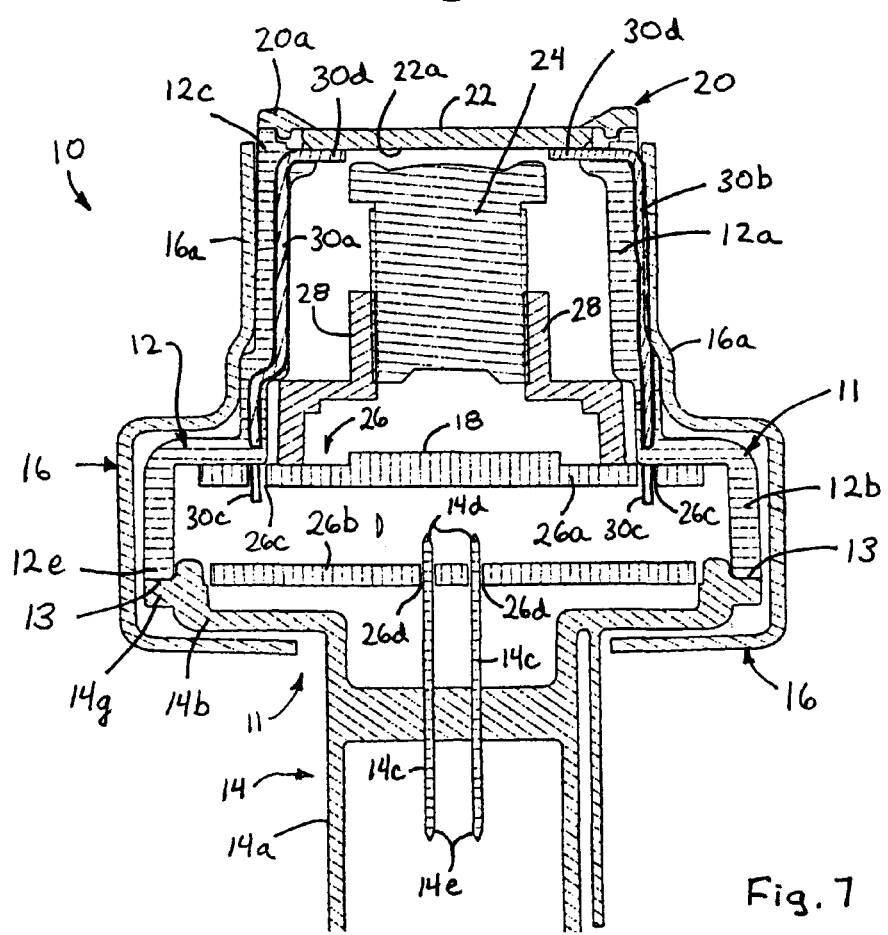
FIG. 7 is a sectional view of the camera module taken along the line VII-VII in FIG. 6.
Figure 8:
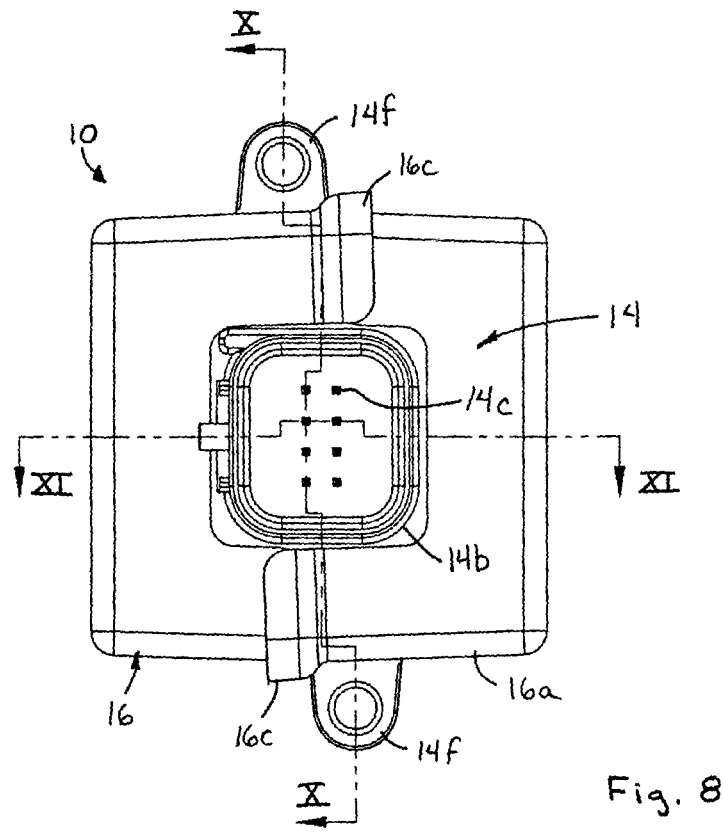
FIG. 8 is an opposite end elevation of FIG. 6 of the camera module of FIGS. 3-7.
Figure 12B:
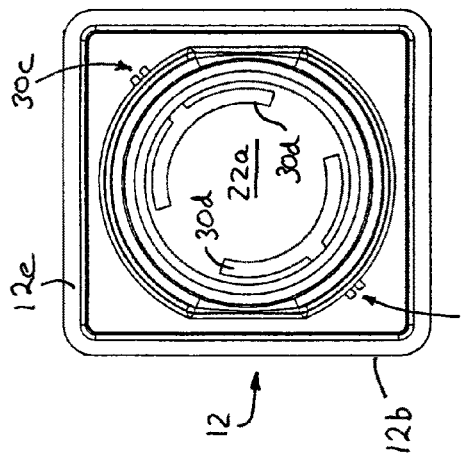
FIG. 12B is an end elevation of the camera housing portion of FIG. 12A.
Figure 12A:
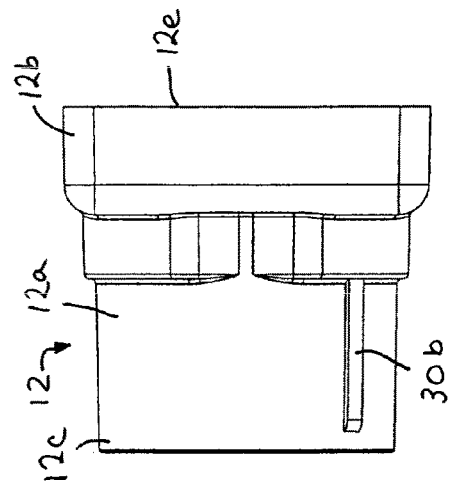
FIG. 12A is a side elevation of a camera housing portion of the camera module of the present invention.
Figure 12C:
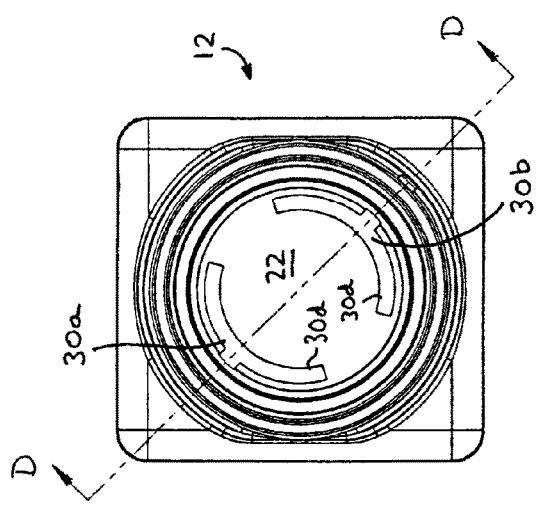
FIG. 12C is an opposite end elevation of FIG. 12B of the camera housing portion of FIGS. 12A and 12B.
Figure 12D:
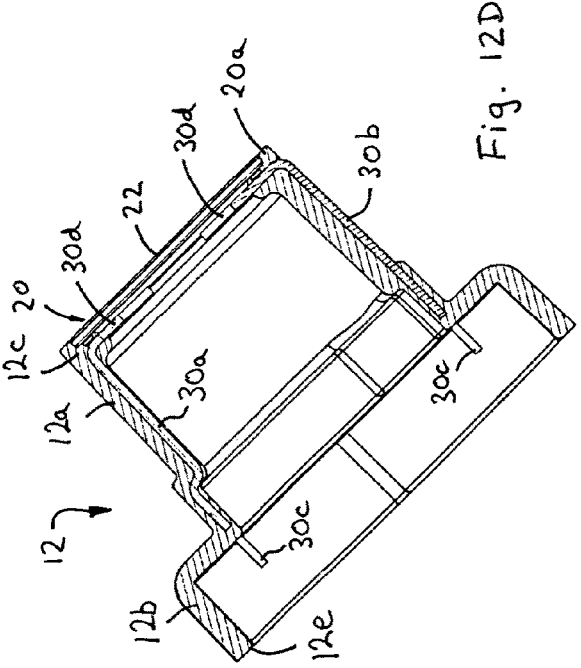
FIG. 12D is a sectional view of the camera housing portion taken along the line D-D in FIG. 12C.

Camera housing portion 12 also includes a pair of heating terminals 30a, 30b which extend from within base portion 12b to outer end 12c substantially along/or within the walls of cylindrical portion 12a. Preferably, the terminals 30a, 30b are insert molded within the cylindrical wall of camera portion 12a. As shown in FIGS. 7 and 12D, the ends 30c of terminal portions 30a, 30b extend downward into base portion 12b of camera receiving portion 12, for connection to circuit board 26, as discussed below. The opposite ends 30d of terminals 30a, 30b extend radially inward at outer end 12c of cylindrical portion 12a and may provide arcuate or semicircular contacts at inner surface 22a of transparent cover 22 (FIGS. 7, 12B and 12C). A power or positive terminal 30a may be insert molded along and at least partially within the cylindrical portion 12a and positioned generally along an interior portion of the cylindrical portion 12a, while a ground or negative terminal 30b is insert molded along and partially within cylindrical portion 12a and positioned along an exterior wall or surface of the cylindrical portion 12a (as can be seen in FIGS. 7 and 12D). The exteriorly positioned ground terminal 30b may contact the metallic protective shield 16, discussed below, to ground the shield to the heating device and/or camera module.

Heating device 30 functions to heat inner surface 22a of transparent cover 22, in order to defrost or defog the cover 22. Heating device 30 may also function to heat the inside or interior compartment of housing 11, in order to maintain the temperature within the housing above a threshold temperature to further limit or substantially preclude moisture from condensing within the camera housing. This is especially useful when implemented in a vented module having a semi-permeable membrane or portion, whereby the heater may generate heat to dry out and drive out any moisture within the camera body compartment. The heated camera module thus may substantially preclude moisture from condensing within the module, since the water vapor would otherwise condense on the coldest surface available within the module.

The power heater terminal 30a may be connected to or in communication with the vehicle battery or other power source and may be energizable to provide electrical current to inner surface 22a of transparent cover 22, while the ground terminal 30b provides a ground connection for the heating device. Energization of terminal 30a thus causes electrical current or electrons to flow across the inner surface 22a of cover 22 to ground terminal 30b. Preferably, inner surface 22a of transparent cover 22 includes a transparent conductive coating or layer, such as an indium tin oxide (ITO) coating or a doped tin oxide coating or the like, such as the types of layers or coatings used in electro-optic or electrochromic mirror technology and as disclosed in U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and 4,712,879, which are hereby incorporated herein by reference. Preferably, the conductive coating or layer provides a resistance of less than approximately 80 ohms per square, and more preferably less than approximately 20 ohms per square. The conductive coating generates heat as electrons or electricity flow from contact 30$d$ of power terminal 30$a$ across surface 22$a$ to contact 30$d$ of ground terminal 30$b$. The contacts 30$d$ are spaced apart at generally opposite sides of the transparent cover 22 and provide for generally uniform and thorough heating of inner surface 22$a$ when electricity is applied to heating terminal 30$a$. As can be seen in FIGS. 12B and 12C, contacts 30$d$ of terminals 30$a$, 30$b$ are preferably semicircular or half-moon shaped contacts to extend substantially across each side of the cover 22, without interfering with the central region of the cover through which the scene may be viewed by the camera and lens.

Preferably, circuit board 26 of camera module 10 also includes a heater circuit for controlling the heater device 30 and heater terminals 30$a$, 30$b$ in response to a temperature sensor (not shown). The heater circuit may be operable to actuate the heater device 30, such as via energizing heater terminal 30$a$, when the temperature at, within or near the camera module (or elsewhere at, in or on the vehicle) drops to a threshold temperature. The control or circuit is also operable to deactivate the heating device at a second predetermined threshold temperature. The heating device thus is operable via a thermostatic circuit which may activate and deactivate the heating device to heat the transparent cover 22 and/or the interior compartment of the housing when the temperature is detected to be low enough to warrant such activation. Such a thermostatic circuit may be operable to activate the heater elements when it is most desirable to heat the transparent cover and/or the interior of the housing and, thus, may limit or substantially preclude fogging or freezing of cover 22 and/or moisture condensing within the housing, while limiting or substantially precluding operation of the heating device in circumstances or situations when heat is not required on the transparent cover or in the housing.

Figure 9:
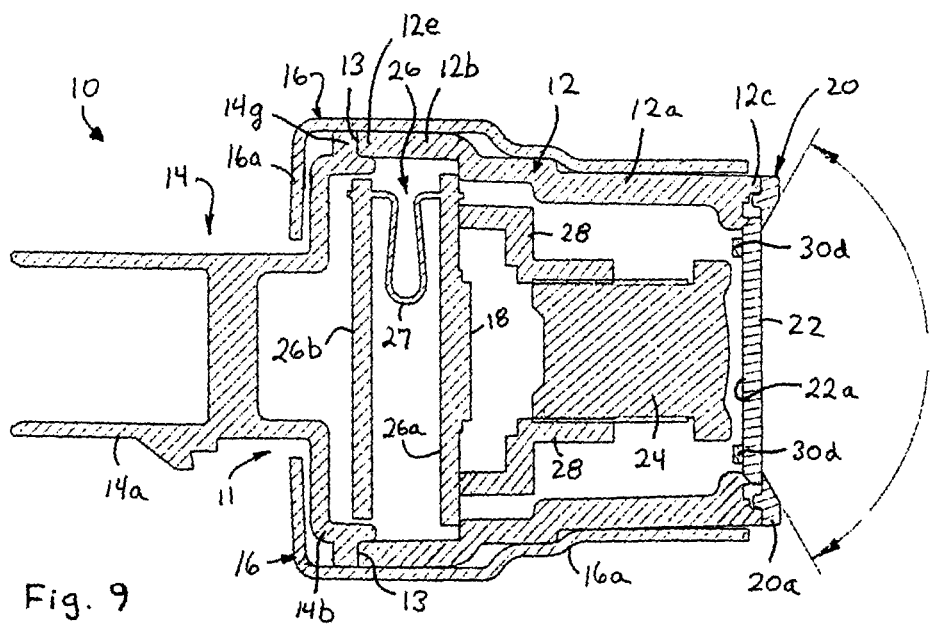
FIG. 9 is a sectional view of the camera module taken along the line IX-IX in FIG. 5.
Figure 10:
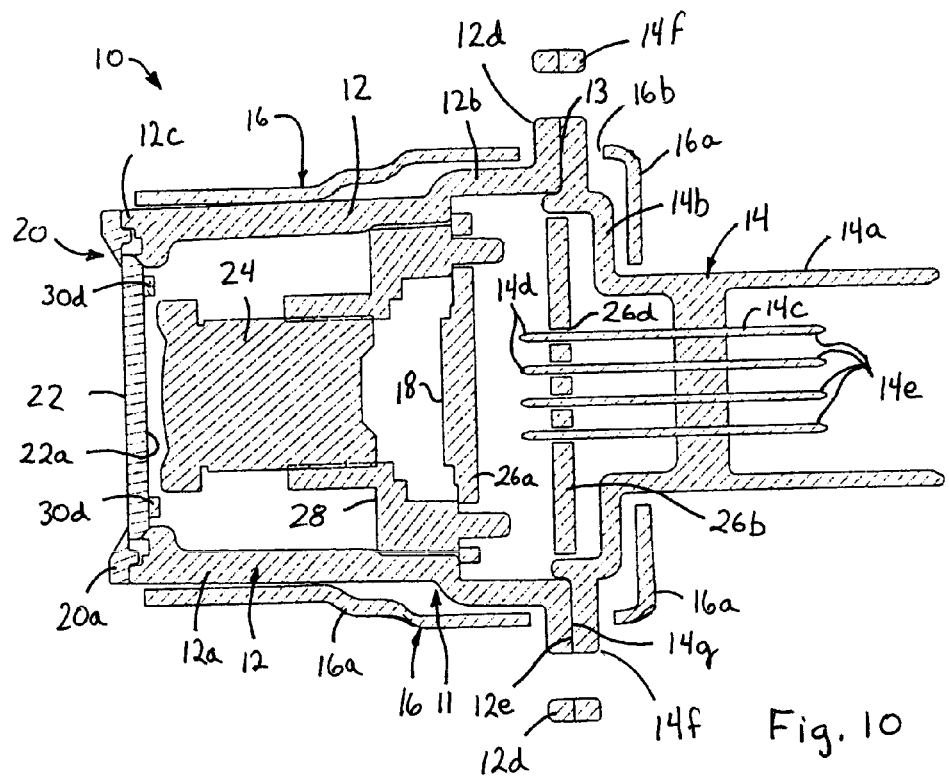
FIG. 10 is a sectional view of the camera module taken along the line X-X in FIG. 8.
Figure 11:
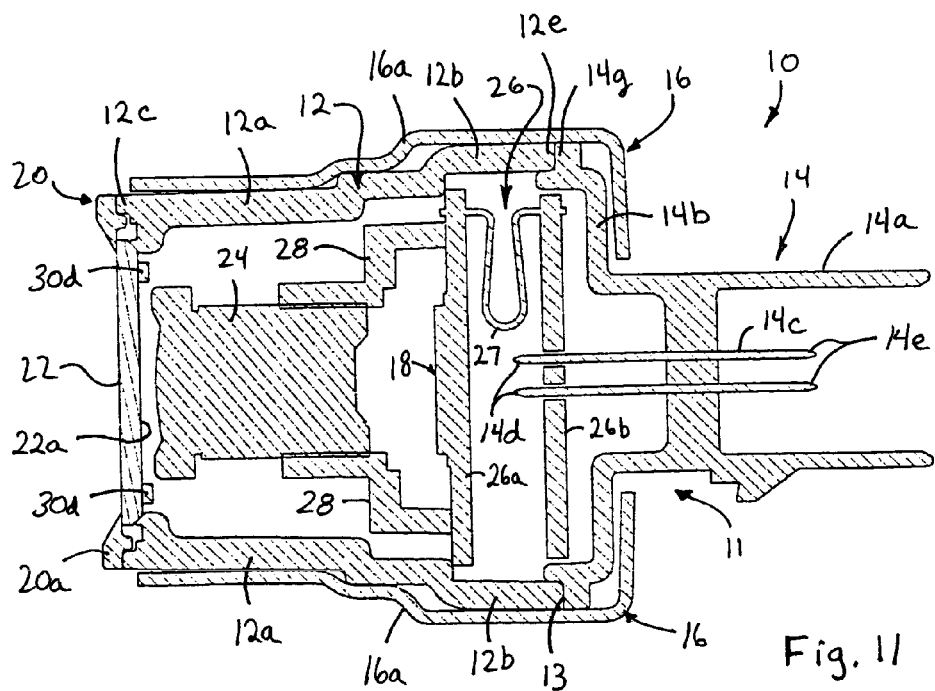
FIG. 11 is another sectional view of the camera module taken along the line XI-XI in FIG. 8.

As best shown in FIGS. 13A, 13B, 14A and 14B, circuit board 26 includes a camera mounting circuit board 26$a$, which is connected to a connector receiving circuit board 26$b$ via a multi-wire ribbon wire 27 or the like. Camera mounting circuit board 26$a$ is mounted or secured to the base portion 12$b$ of camera portion 12, while connector circuit board 26$b$ is mounted or secured to the base portion 14$b$ of connector portion 14. Camera or image sensor 18 is mounted at a surface of camera circuit board 26$a$, and is substantially encased at circuit board 26$a$ by camera cover 28 and lens 24 (FIGS. 7 and 9-11). As shown in FIGS. 7, 13A and 14A, camera circuit board 26$a$ includes a pair of apertures 26$c$ for receiving ends 30$c$ of heating terminals 30$a$, 30$b$. Likewise, connector circuit board 26$b$ includes a plurality of openings or apertures 26$d$ for receiving ends 14$d$ of connector terminals 14$c$ therethrough (FIGS. 7, 10, 11 and 13A). The ends of the pins or terminals may be soldered in place in their respective openings. As shown in FIGS. 9, 11 and 14B, circuit board 26 is folded at ribbon wire 27, such that circuit board 26$a$ generally overlaps circuit board 26$b$ when they are positioned within the base portions 12$b$, 14$b$ of the camera housing. The circuit board 26 may thus fold to an open position after the separate boards 26$a$, 26$b$ are secured within their respective base portions of the housing to facilitate soldering of the connector terminals or heater terminals at the respective circuit boards. After all of the connections are made, the housing may be folded to its closed position and laser welded or sonic welded together or otherwise joined or bonded together to substantially seal the circuit board within the housing.

Optionally, the exterior surface 22$b$ of cover 22 (which may be exposed to the atmosphere exterior of the camera module) may be coated with an anti-wetting property such as via a hydrophilic coating (or stack of coatings), such as is disclosed in U.S. Pat. Nos. 6,193,378; 5,854,708; 6,071,606 and 6,013,372, the entire disclosures of which are hereby incorporated by reference herein. Also, or otherwise, the exterior or outermost surface 22$b$ of cover 22 may optionally be coated with an anti-wetting property such as via a hydrophobic coating (or stack of coatings), such as is disclosed in U.S. Pat. No. 5,724,187, the entire disclosure of which is hereby incorporated by reference herein. Such hydrophobic property on the outermost surface of the cover can be achieved by a variety of means, such as by use of organic and inorganic coatings utilizing a silicone moeity (for example, a urethane incorporating silicone moeities) or by utilizing diamond-like carbon coatings. For example, long-term stable water-repellent and oil-repellent ultra-hydrophobic coatings, such as described in PCT Application Nos. WO0192179 and WO0162682, the entire disclosures of which are hereby incorporated by reference herein, can be disposed on the exterior surface of the cover. Such ultra-hydrophobic layers comprise a nano structured surface covered with a hydrophobic agent which is supplied by an underlying replenishment layer (such as is described in Classen et al., "Towards a True 'Non-Clean' Property: Highly Durable Ultra-Hydrophobic Coating for Optical Applications", ECC 2002 "Smart Coatings" Proceedings, 2002, 181-190, the entire disclosure of which is hereby incorporated by reference herein).

In the illustrated embodiment, camera module 10 includes a protective shield or casing 16 which partially encases the plastic housing 11 and functions to limit or reduce electronic noise which may enter or exit camera module 10 and may protect the plastic housing from damage from impact of various items or debris which the camera module may encounter at the exterior portion of the vehicle. The protective shield or casing 16 includes a pair of casing portions 16$a$ (one of which is shown in FIGS. 16A-16E). Each of the casing portions 16$a$ partially encases about half of the plastic housing 11 of camera module 10 and partially overlaps the other of the casing portion 16$a$, to substantially encase the plastic housing within protective shield 16. Each of the portions 16$a$ includes a slot 16$b$ for receiving the mounting tabs 12$d$, 14$f$ therethrough for mounting the camera module at the desired location at the vehicle. Each casing portion 16$a$ includes overlapping portions 16$c$ which overlap an edge of the other casing portion 16$a$ to assemble the casing 16 around the plastic housing. The casing portions 16$a$ may be welded, crimped, adhered, banded, or otherwise joined or secured together about the plastic housing 11, in order to encase the housing 11. Preferably, protective shield 16 comprises a metallic shield and contacts ground terminal 30$b$ of heating device 30 at the exterior surface of the cylindrical portion 12$a$ of camera receiving portion 12 and, thus, may be grounded to the heating device and/or the camera module or unit via the ground terminal 30$b$, as can be seen with reference to FIG. 7. Protective shield 16 may comprise a stamped metal shielding or may be formed by vacuum metalizing a shield layer over the plastic housing 11, or may comprise a foil or the like, without affecting the scope of the present invention.

With reference to FIGS. 17A-17E, a camera module 10' is shown which includes a connector portion 14' of a housing 11' which provides for a 90 degree bend in the connector pins or terminals 14c' to accommodate different mounts or connections to a connector of the vehicle. Other bends or shapes of the molded connector portion may be implemented without affecting the scope of the present invention. The other components of camera module 10' are substantially similar to the respective components of camera module 10, discussed above, such that a detailed discussion of those components will not be repeated herein. The common components are shown in FIGS. 17A-17E with the same reference numbers as assigned to the respective components of camera module 10 of FIGS. 1-16.

Therefore, the present invention provides a sealed camera module which may provide a substantially watertight and substantially hermetically sealed housing about a camera or image sensor of the camera module. The housing components may be laser welded or sonic welded together which substantially seals the plastic housing and substantially precludes water intrusion or the like into the housing at the seams or mating portions of the housing. Because the plastic housing of the camera module of the present invention may be laser welded or sonic welded together to substantially seal the housing, the housing may provide an economical and rugged, environmentally resilient and protective housing for the camera or sensor and circuit board. The unitary housing and connector also makes it easy to install and connect the camera module to a vehicle connector.

Alternately, the camera module of the present invention may comprise a vented camera module, where the housing includes a semi-permeable ventilation or venting portion, such as a Gore-Tex assembly, area or patch or the like, which allows for ventilation of water vapor into and out from the housing, while substantially precluding entry of water droplets or dirt or other contaminants or the like into the housing. The plastic vented module of the present invention thus may also provide an economical and rugged, environmentally resilient and protective housing for the camera or sensor and circuit board.

Additionally, the camera module of the present invention may include a heating device which functions to heat a transparent conductive coating on a transparent cover of the housing, so as to provide heat to the cover to defrost or defog the cover. The heater elements may be insert molded within the plastic housing of the camera module and may plug into a circuit board received within the housing as the camera module is assembled. Preferably, the heating device may be operable in response to a temperature sensor, such that the heating device may be activated when the temperature drops to a threshold temperature and then deactivated after the temperature has been elevated to a second higher threshold temperature. The heating device is thus automatically operable in low temperature levels when it may be desirable to activate the heating device. The heating device may be activated to defrost or defog the transparent cover of the camera module and/or to heat the interior chamber of the camera module to limit or substantially preclude moisture condensing therein. Heating the interior compartment of the camera module may dry out any moisture within the module and may limit or substantially preclude condensation from forming within the module. In applications where the camera module comprises a vented camera module, the heat generated within the vented camera module may also drive out water vapor through the semi-permeable ventilation area to further limit or substantially preclude water vapor from condensing within the camera module.

Figure 18:
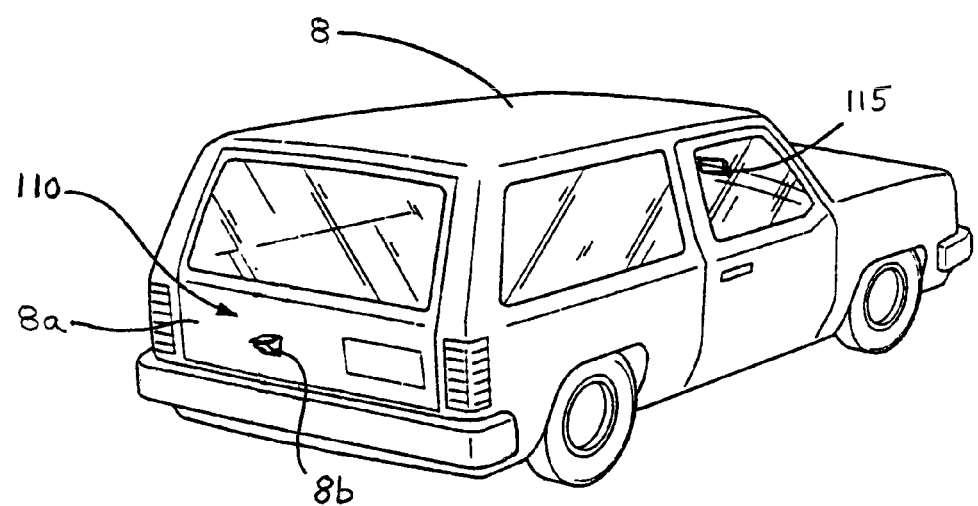
FIG. 18 is a rear perspective view of a vehicle with a camera housing device in accordance with the present invention positioned thereon and positioned in its in-use or operational position.
Figure 19:
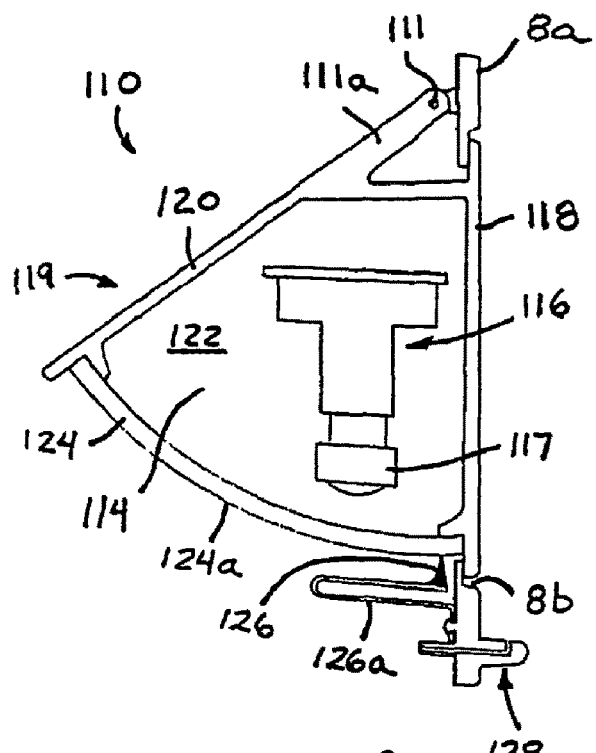
FIG. 19 is a side elevation and sectional view of a camera housing device in accordance with the present invention, with the camera housing device positioned so the camera is in its stored position.
Figure 20:
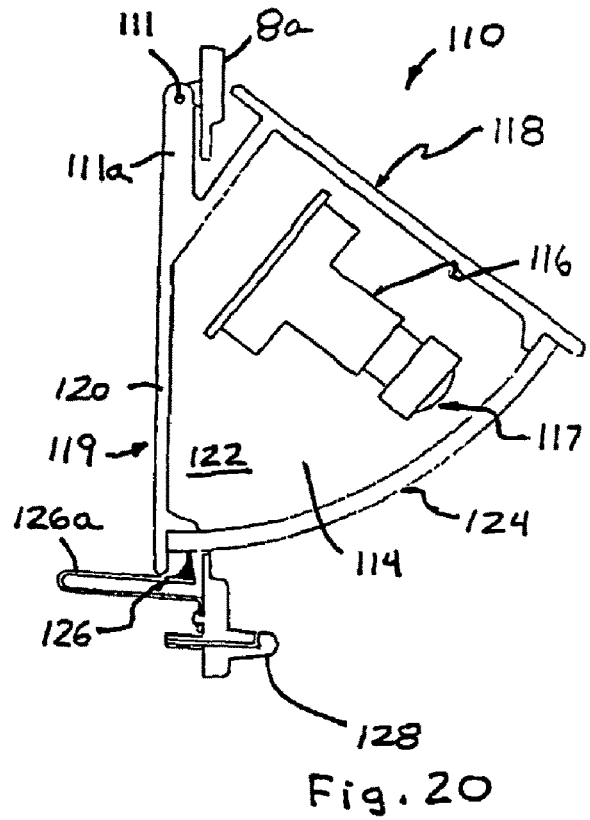
FIG. 20 is a side elevation and sectional view similar to FIG. 19, with the camera housing device positioned so the camera is in its operational position.

Referring now to FIGS. 18-20, a camera housing device 110 may house or contain a camera or imaging device 116 and protect the camera from exposure to the elements in applications where the camera may be positioned at a vehicle 8 (FIG. 18) for viewing an area or scene exterior of the vehicle. The camera housing device 110 may be positioned at least partially within an opening 8b at an exterior portion 8a of a vehicle 8 (such as a rearward portion or side portion or elsewhere on the vehicle). The housing device 110 defines a compartment or cavity 114 for receiving camera or imaging device 116 therein and is operable or movable to move the camera or imaging device 116 between a stored position (FIG. 19) and an operational or extended or in-use position (FIG. 20). The camera 116 and compartment 114 are positioned generally inwardly of an outer panel or flap 118 of housing device 110 at the exterior portion 8a of the vehicle 8 when the housing device and camera are in the stored position. As shown in FIG. 19, the outer panel or flap 118 is positioned generally along the exterior portion 8a of the vehicle a and serves as a cover or flap over the opening 8b when housing device 110 is in its stored position.

Imaging device 116 may be operable in conjunction with a vision or imaging system of the vehicle, such as a reverse or backup aid system, such as a rearwardly directed vehicle vision system utilizing principles disclosed in U.S. Pat. Nos. 5,550,677; 5,760,962; 5,670,935; 5,760,962; 5,877,897; 5,949,331; 6,222,447; 6,302,545; 6,396,397; 6,498,620; 6,523,964; 6,611,202 and/or 6,201,642, and/or in U.S. patent application Ser. No. 09/199,907, filed Nov. 25, 1998, now U.S. Pat. No. 6,717,610; Ser. No. 10/372,873, filed Feb. 24, 2003, now U.S. Pat. No. 6,802,617; Ser. No. 10/011,517, filed Nov. 5, 2001, now U.S. Pat. No. 6,806,452; Ser. No. 10/324,679, filed Dec. 20, 2002, now U.S. Pat. No. 6,891, 563; Ser. No. 10/047,901, filed Jan. 14, 2002, now U.S. Pat. No. 6,822,563; Ser. No. 10/643,602, filed Aug. 19, 2003, now U.S. Pat. No. 7,859,565; and Ser. No. 10/010,862, filed Dec. 6, 2001, now U.S. Pat. No. 6,757,109, which are hereby incorporated herein by reference, a trailer hitching aid or tow check system, such as the type disclosed in U.S. patent application Ser. No. 10/418,486, filed Apr. 18, 2003, now U.S. Pat. No. 7,005,974, which is hereby incorporated herein by reference, or an imaging system that may utilize aspects of other imaging or vision systems, such as the types disclosed in U.S. patent application Ser. No. 10/054,633, filed Jan. 22, 2002, now U.S. Pat. No. 7,195,381; and Ser. No. 09/793,002, filed Feb. 26, 2001, now U.S. Pat. No. 6,690,268, which are hereby incorporated herein by reference. The imaging system includes a control or control system or device that is operable to process images captured by the imaging device 116 and a display 115 (FIG. 1) for displaying the captured images to a driver or occupant of the vehicle. The display may be positioned at an interior portion of the vehicle, such as at an interior rearview mirror assembly of the vehicle or accessory module of the vehicle or the like. The display may comprise a video display screen at a mirror assembly, such as the type disclosed in U.S. provisional applications, Ser. No. 60/439,626, filed Jan. 13, 2003; Ser. No. 60/489,812, filed Jul. 24, 2003; and Ser. No. 60/492,225, filed Aug. 1, 2003, which are hereby incorporated herein by reference, or may comprise other types of displays or display systems, such as, for example, a display on demand type of display, such as the types disclosed in commonly assigned U.S. Pat. Nos. 5,668,663 and 5,724,187, and U.S. patent application Ser. No. 10/054,633, filed Jan. 22, 2002, now U.S. Pat. No. 7,195,381; and Ser. No.

09/793,002, filed Feb. 26, 2001, now U.S. Pat. No. 6,690, 268, which are hereby incorporated by reference herein, without affecting the scope of the present invention.

The control may also be operable to move the camera housing device between the operational and stored positions. The method of actuation of the housing to move the housing and camera may be accomplished by a motor, such as via a gear or screw mechanism, or by vacuum compressed air or by magnetic or electromagnetic means, such as in the form of a solenoid or the like. Optionally, the camera housing device 110 may be movable to the operational position in response to an engagement of the reverse gear of the vehicle, or in response to an actuation of a backup aid or other reverse viewing system of the vehicle. Optionally, the camera housing may be moved to the operational position in response to a user input or the like, without affecting the scope of the present invention. The camera housing thus allows for occasional use of the camera and may store and protect the camera when the camera is not in use.

Imaging device or camera 116 may comprise a camera device or other image capturing device, such as a video camera or sensor, such as a CMOS imaging array sensor, a CCD sensor or the like, such as the types disclosed in commonly assigned, U.S. Pat. Nos. 5,550,677; 5,760,962; 6,097,023 and 5,796,094, which are hereby incorporated herein by reference. Such imaging array sensors comprise an array of photo-sensing pixels to sense light present in the field of view of the sensor. The imaging device 116 may comprise a color sensing imaging device, which includes color filters such that the photo-sensing pixels of the imaging device sense particular colors of light from the scene. Optionally, the imaging device may or may not include an infrared filter to filter or attenuate infrared or near infrared light present in the exterior scene. Optionally, the imaging device may provide an infrared sensing capability to provide enhanced performance of the imaging device during nighttime and/or darkened conditions where the visible light intensity is reduced. Optionally, the housing device may include two separate imaging devices, one for sensing color light for daytime lighting conditions and one for sensing infrared light for nighttime or darkened lighting conditions, as discussed below. Alternately, the control may be operable to selectively switch the imaging sensor between a color mode and a monochromatic mode, such as via utilization of principles described below with respect to imaging system 310. The imaging device may have a lens 117 positioned in front of the sensor, and may utilize aspects of an imaging module of the types described above with respect to the camera modules 10, 10' of FIGS. 1-17.

Housing device 110 mounts or attaches the camera 116 generally at the external flap 118, such that the movement of the external flap between its opened position (FIG. 20) and its closed position (FIG. 19) moves the camera between its operational position and its stored position. The reverse aid camera or imaging device 116 is thus mounted behind the flap 118 such that when the camera is not in use it may be retracted into the vehicle exterior portion or body portion 8a, thereby protecting it from the elements, such as dirt or debris or the like, and keeping the lens 117 relatively clean. The outer flap 118 may partially overlap the edges of the opening 8b in exterior portion 8a of vehicle 8 and may be generally aligned with an outer or exterior surface of the exterior portion to provide a generally flush, finished appearance to the exterior portion 8a when the housing device 110 is in the stored or closed position.

As shown in FIGS. 19 and 20, the camera 116 may be mounted in a housing or box or container 119 attached to the flap 118, such that the camera 116 is substantially contained or encased within the compartment 114 defined within the housing 119. The housing device 110 may define compartment or cavity 114 within and between an inner wall or flap 120 and external flap 118, and opposite side walls or flaps 122 (only one side wall shown in FIGS. 19 and 20). The housing 119 of camera housing device 110 may be pivotable about a generally horizontal pivot axis or pin 111 at the exterior portion 8a of the vehicle 8. In the illustrated embodiment, housing device 110 includes a pivot arm or extension 111a extending from inner wall 120. The pivot arm 111a pivotally mounts to a pivot pin 111 and may pivotally move or swing the housing 119 between the stored position and the operational position. The pivot pin or axis 111 may be positioned within the exterior portion 8a of the vehicle 8 and generally adjacent to the edge of the opening 8b in the exterior portion 8a.

Optionally, the housing device may be positioned at a side portion of the vehicle (such that the housing may pivot about a generally vertical pivot axis or the like) or at a generally horizontal portion of the vehicle (such that the housing may pivot about a generally horizontal pivot axis and may have an outer flap that is generally horizontal when in its closed orientation, with the camera and housing positioned generally above or below the closed flap, depending on the particular application) or elsewhere on or in the vehicle, without affecting the scope of the present invention.

Housing 119 may include a clear or transparent glass or plastic window or panel 124 that at least partially closes the compartment 114 and that is positioned generally in front of the camera or imaging device 116 and covers or generally encases the lens 117 of the camera or imaging device 116. The transparent panel 124 may comprise a visible light transmitting panel that may substantially transmit visible light present in the scene to the imaging sensor 116 within housing 119 and behind transparent panel 124. The transparent panel 124 may comprise a substantially clear or transparent panel to provide protection to the lens and imaging sensor within the housing. Optionally, the transparent panel may comprise or provide an optical lens or may have optical qualities or characteristics or properties, whereby the transparent panel may function to serve or augment the lens of the imaging sensor.

Optionally, a wiper blade or wiping or cleaning device 126 may be positioned at the opening 8b of the exterior portion 8a of the vehicle 8 and may engage or wipe the outer surface 124a of the transparent panel 124 as the housing device 110 moves between the stored position and the operational position, in order to brush or clean or wipe debris or dirt or the like from the transparent panel 124. The wiper blade or device 126 may be spring loaded or biased (such as via a flexible spring clip 126a or the like) into engagement or contact with the surface 124a of the window or panel 124 such that as the housing device 110 opens and closes, the wiper 126 engages and wipes and cleans the window 124.

The transparent panel 124 thus may comprise a curved or arcuate panel such that the wiping device 126 generally uniformly engages the outer surface of the transparent panel as the housing device is opened and closed. However, the transparent panel may comprise other forms (and may be a generally flat panel), whereby the wiping device may engage only a desired portion of the panel or may be biased more toward the panel to maintain engagement of the wiping device with the panel during movement of the housing device. Optionally, a washer jet 128 may also be positioned at or near the opening 8b and may be operable to spray washer fluid or the like toward the panel or window 124 to clear dirt from the panel or window and to limit or prevent scratching of the window by the wiper.

Optionally, the housing device 110 may include a heating element that is operable to heat the transparent panel or window 124 to reduce moisture that may be present on the window. For example, window 124 may be heated by conductive strips embedded in the window, or surface mounted conductive strips, or ITO coatings or similar conductive or semi-conductive coatings or the like, such as described above with respect to camera module 10, 10'. The heater thus may heat the window to limit or substantially avoid condensation obscuring the field of view of the camera. Optionally, condensation may be limited by the use of a desiccant substance or by venting the enclosure or the like, without affecting the scope of the present invention.

Optionally, the exterior surface 124a of window 124 may be coated with an anti-wetting property such as via a hydrophilic coating (or stack of coatings), such as is disclosed in U.S. Pat. Nos. 6,193,378; 5,854,708; 6,071,606 and 6,013,372, the entire disclosures of which are hereby incorporated by reference herein. Also, or otherwise, the exterior surface 124a of window 124 may optionally be coated with an anti-wetting property such as via a hydrophobic coating (or stack of coatings), such as is disclosed in U.S. Pat. No. 5,724,187, the entire disclosure of which is hereby incorporated by reference herein. Such hydrophobic property on the outermost surface of the window or panel can be achieved by a variety of means, such as by use of organic and inorganic coatings utilizing a silicone moeity (for example, a urethane incorporating silicone moeities) or by utilizing diamond-like carbon coatings. For example, long-term stable water-repellent and oil-repellent ultra-hydrophobic coatings, such as described in PCT Application Nos. WO0192179 and WO0162682, the entire disclosures of which are hereby incorporated by reference herein, can be disposed on the exterior surface of the window. Such ultra-hydrophobic layers comprise a nano structured surface covered with a hydrophobic agent which is supplied by an underlying replenishment layer (such as is described in Classen et al., "Towards a True 'Non-Clean' Property: Highly Durable Ultra-Hydrophobic Coating for Optical Applications", ECC 2002 "Smart Coatings" Proceedings, 2002, 181-190, the entire disclosure of which is hereby incorporated by reference herein).

Figure 21:
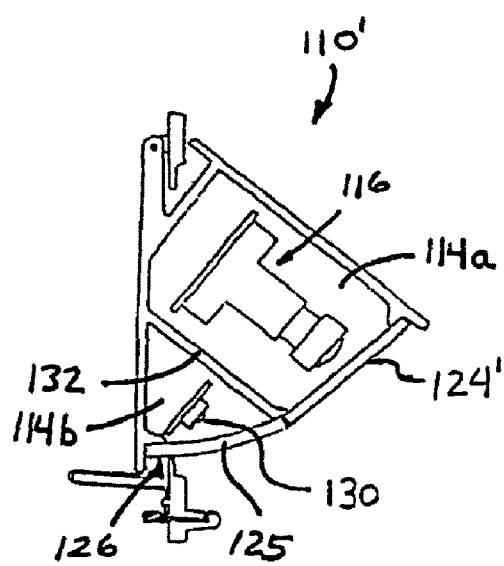
FIG. 21 is a side elevation and sectional view of another camera housing device in accordance with the present invention, with an illumination source positioned within the camera housing device and movable with the housing device and camera.

In some applications, it may be advantageous and desirable to add additional illumination to the exterior scene being captured by the camera. Accordingly, a camera housing device 110' may house or contain an imaging device or camera 116 and an illumination source or auxiliary light 130 (FIG. 21) that is operable to direct illumination toward the field of view of the camera 116. The illumination source 130 may provide visible light, infrared or near infrared light or may be pulsed to provide pulsed infrared or near infrared light. The auxiliary light 130 may be fixedly positioned on the external bezel portion of the camera housing or of the exterior portion of the vehicle, or optionally, and preferably, may be positioned within the housing and as part of the camera housing device or assembly (such as shown in FIG. 21). In this way, the panel 125 in front of the illumination device 130 may also be cleaned by the same operation or wiper 126 that cleans the transparent panel 124' in front of the camera 116.

Under some conditions, the light from the auxiliary illumination source 130 may be reflected, piped or refracted in or along the compartment and/or transparent panel in such a way that it may interfere with the image captured by the camera. Such interference may be avoided by splitting the clear window (as shown in FIG. 21) such that there is a window or panel 124' in front of the camera and a second window or panel or section 125 in front of the illumination source 130. Optionally, a divider or separating wall or panel or baffle 132 may be positioned between the compartments 114a, 114b that contain the camera 116 and illumination source 130, respectively. In the illustrated embodiment, the camera transparent panel 124' is substantially flat or planar, while the light transparent panel 125 is curved or arcuate. However, the transparent panels 124', 125 may be other shapes, without affecting the scope of the present invention. The separate panels and baffle provide a non-continuous path for the light to travel, so that the light will not have an adverse effect on the images being captured, while still providing for the external surface or surfaces of the panel or panels to be cleaned by the same wiper device. Optionally, by splitting the window into two panels 124', 125, the panel 125 covering the auxiliary light may be colored, such as red, to improve the appearance of the product on the vehicle. The camera housing device 110' is otherwise substantially similar to camera housing device 110, discussed above, such that a detailed discussion of the camera housing device will not be repeated herein.

Optionally, to improve the performance of the camera, the light level or intensity of the light emitted by the auxiliary light may be monitored by a sensor or device or control, and a control circuit may be used to adjust the camera for different light levels. Such a camera adjustment system would enhance the performance of the camera over a wide range of light conditions, and may also be used to control the auxiliary light if desired.

Optionally, when the camera housing is in the closed position, the camera and the auxiliary light may be at least occasionally turned on to illuminate the enclosed cavity and to capture an image of the illuminated enclosed cavity and transparent window. The enclosed cavity provides a known image, and the images captured by the camera in this orientation may be used to examine the window for condensation, dirt or other abnormalities. If condensation is detected on the window, a heater or heating mechanism may be activated to dry or evaporate the moisture from the window. The camera thus may be used to control the heaters that are used to remove condensation from the window. Optionally, if heating the window or cleaning the window does not alleviate a detected abnormality (such as if the same abnormality is detected after two or more openings and closings of the housing device), the control may provide an indication to a user of the imaging system that the transparent window may need to be checked or replaced (in case the abnormality detected is a chip or scratch or crack or the like that may adversely affect the performance of the imaging system).

Because the camera housing device is adjustable and may move the camera, the camera housing device of the present invention may provide the ability to change the field of view. For example, the camera can be moved to the furthest out or fully extended position for an initial approach to a parking zone or target zone or area. As the vehicle further enters the parking zone, the camera can be adjusted or moved to a more vertical angle (by pivoting or moving the housing device partially toward the closed position) to display the proximity of the bumper to any obstacle in the exterior scene. Such an adjustment of the camera position or orientation may also be combined with a change or adjustment of the lens configuration, such as by using a longer focal length for the initial approach (which may provide a less distorted view or image) and a wider angle configuration for the close range viewing to provide a wider field of view to the driver of the vehicle during the back up or reverse driving or maneuvering of the vehicle.

Also, by using the folding adjustment of the camera housing device to adjust the position of the camera, the housing device and camera may be adjustable to provide a different view of the area behind the vehicle. The control of the imaging system may then be operable to process images captured in each of the views and may compare the images to determine distances to objects detected in the exterior scene (such as by utilizing principles disclosed in U.S. Pat. No. 6,396,397 and/or in U.S. patent application Ser. No. 10/427,051, filed Apr. 30, 2003, now U.S. Pat. No. 7,038,577, which are hereby incorporated herein by reference). By electronic comparison of the images captured between two positions of the camera (capturing at least one image in each of the two views), a distance map can be produced. Such a distance map may then be used to provide additional information about the exterior scene to the driver of the vehicle.

Optionally, the housing may not be restricted to one camera and may instead house or include two cameras for different imaging situations. For example, a standard color camera could be used for daylight conditions, while an infrared camera may be used for night or darkened conditions. The infrared or night camera may comprise a CMOS camera or the like without color or infrared filtering, such that it may be highly sensitive to infrared light that is present in the visibly darkened scene. The control may selectively activate the appropriate camera or imaging sensor in response to the ambient light level or intensity present at the exterior scene, such as in response to an ambient light sensor or in response to a light detection by one or both of the imaging sensors or the like. When the night camera is operated or used, the control may also activate (such as continuously activate or pulse) an infrared or near infrared illumination source at the exterior portion of the vehicle (such as within the compartment of the housing device, as discussed above). Optionally, a single camera or imaging sensor may be switched between a color mode and a monochromatic mode (such as described below with respect to imaging system 310), and an infrared illumination source may be activated when in the monochromatic mode, to enhance the performance of the camera or imaging sensor in various lighting conditions.

Although shown as being positioned at a rearward portion of a vehicle, the camera housing device of the present invention may be positioned elsewhere on the vehicle, such as a forward portion of the vehicle or a sideward portion of the vehicle or a roof portion of the vehicle or the like, without affecting the scope of the present invention. Also, although the camera housing device is shown as being mounted on a nearly vertical body portion of the vehicle, the camera housing device may be mounted or positioned at a nearly horizontal surface (such as may be found in the top of a number plate appliqué or the like), without affecting the scope of the present invention. In such a horizontal mounting application, the flap of the housing device may drop down to expose the clear window and to move the camera into its operational position.

Figure 22:
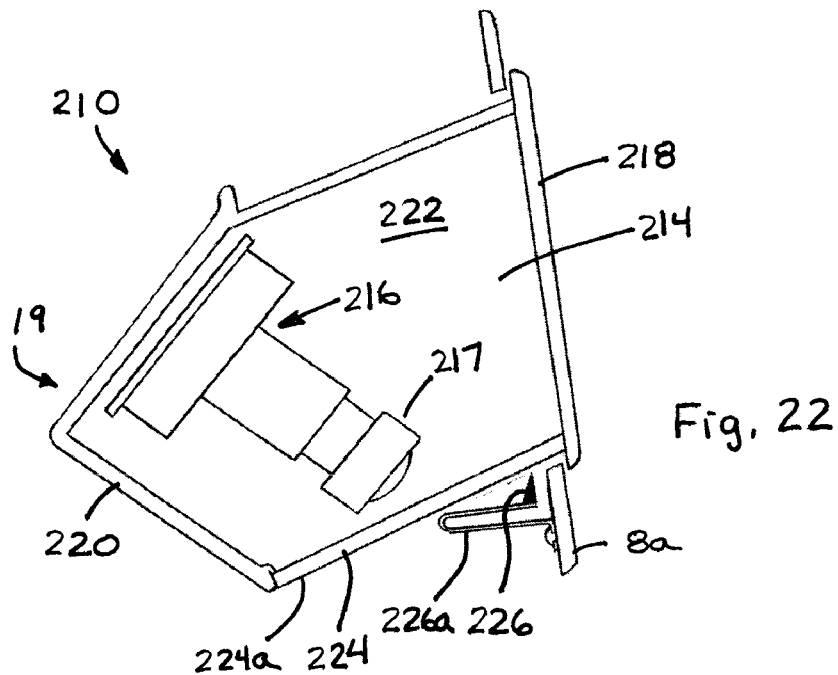
FIG. 22 is a side elevation and sectional view of another camera housing device in accordance with the present invention, with the camera housing device being slidable to move the camera between its stored position and operational position, and with the camera housing device shown in the stored position.
Figure 23:
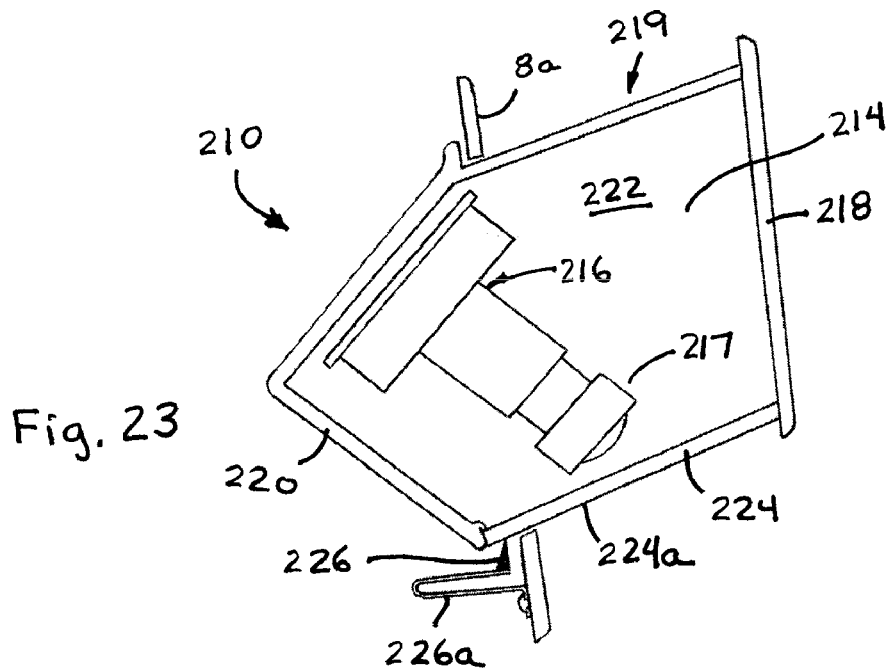
FIG. 23 is a side elevation and sectional view of the camera housing device of FIG. 22, with the camera housing device shown in the extended or operational position.

Referring now to FIGS. 22 and 23, a camera housing device 210 holds or contains a camera or imaging device 216 and is movably mounted to an exterior portion 8a of a vehicle. The housing device 210 is movable to move the camera 216 (and associated lens 217) between a stored position (FIG. 22) and an operational position (FIG. 23). Housing device 210 includes a housing portion 219 that defines the cavity or compartment 214 within an outer panel or flap 218, an inner panel 220 and side panels 222 (one side panel is shown in FIGS. 22 and 23). A transparent cover 224 may close a portion of the cavity and may be positioned generally in front of the imaging device, such that imaging device has a field of view through the transparent window or panel and toward the exterior scene, as discussed above. Housing device 210 is generally linearly slidable relative to the exterior portion 8a of the vehicle (such as via a linear motor, an electromagnetic device or solenoid, a pneumatic device and/or the like) to extend outward from the exterior portion of the vehicle when in the operational position, as shown in FIG. 23.

The housing device 210 thus may be generally linearly moved outward and inward relative to the vehicle portion 8a. Accordingly, the transparent panel 224 may be a substantially flat or planar panel, such that the wiper device 226 (such as a wiper blade or the like on a spring or biasing member or the like 226a) may engage and wipe the surface 224a of the panel 224 as the panel is moved along adjacent to the wiper device 226. Optionally, the housing device 210 may be generally tubular or even generally cylindrical in shape, such that the transparent panel is curved, while the wiper device is correspondingly curved to substantially uniformly engage the curved or tubular transparent panel as the housing device is moved between the stored and operational positions. The wiping motion of the wiper on the transparent window or panel may thus be achieved by making the camera housing device a generally tubular construction that slides in and out in a generally linear motion, whereby the wiper can then clean the transparent window as the housing device moves in and out. The housing device 210 may otherwise be substantially similar to the housing device 110, 110', discussed above, such that a detailed discussion of the housing device will not be repeated herein.

Therefore, the present invention provides a camera housing device that contains a camera and lens of an imaging system at or partially within an exterior portion of a vehicle. The camera housing device is movable or adjustable to move the camera between an operational position and a stored position. The camera thus may be positioned in a stored position within an exterior portion of the vehicle when not in use. The exterior panel of the camera housing may provide an exterior cover at the exterior portion of the vehicle to protect the camera and lens from the elements when they are not in use. The housing device may include a transparent panel that substantially encloses the camera and lens within the housing. The housing device may also include a panel cleaning device that may clean the transparent panel to limit or substantially preclude dirt buildup or debris on the panel that may adversely affect the performance of the camera and thus of the imaging system.

Figure 24:
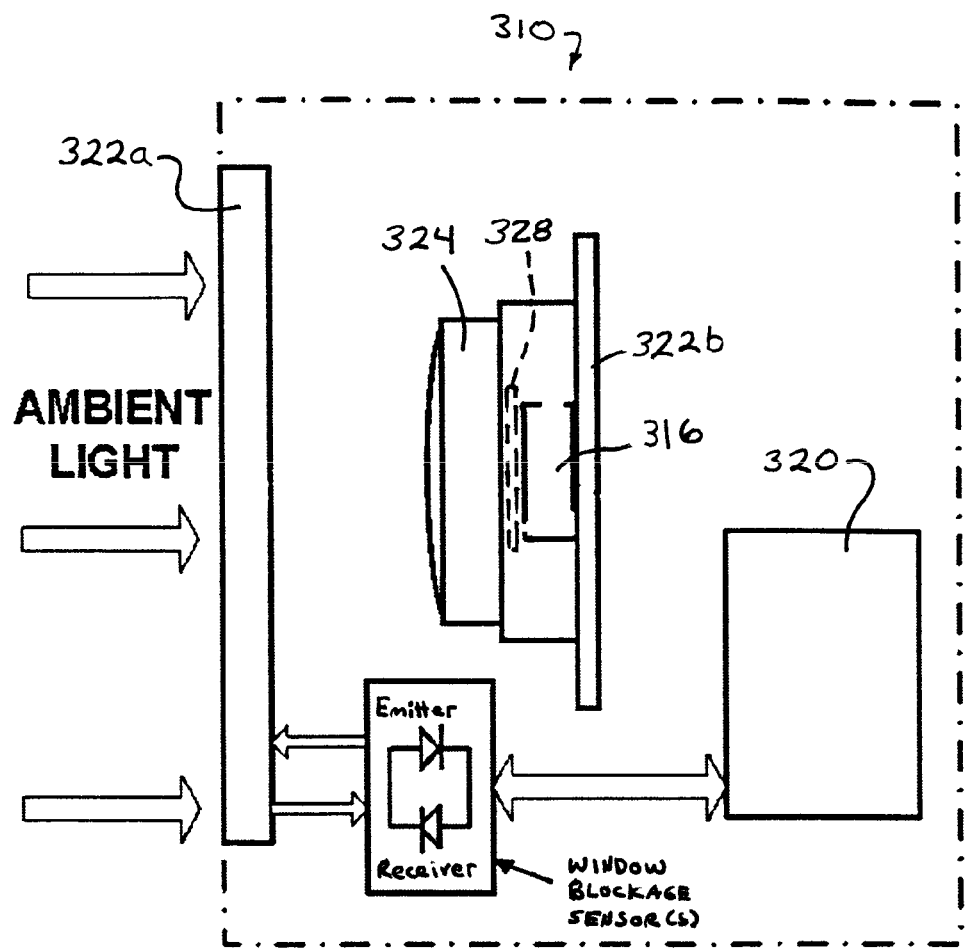
FIG. 24 is a schematic of an image capture device in accordance with the present invention.
Figure 25:
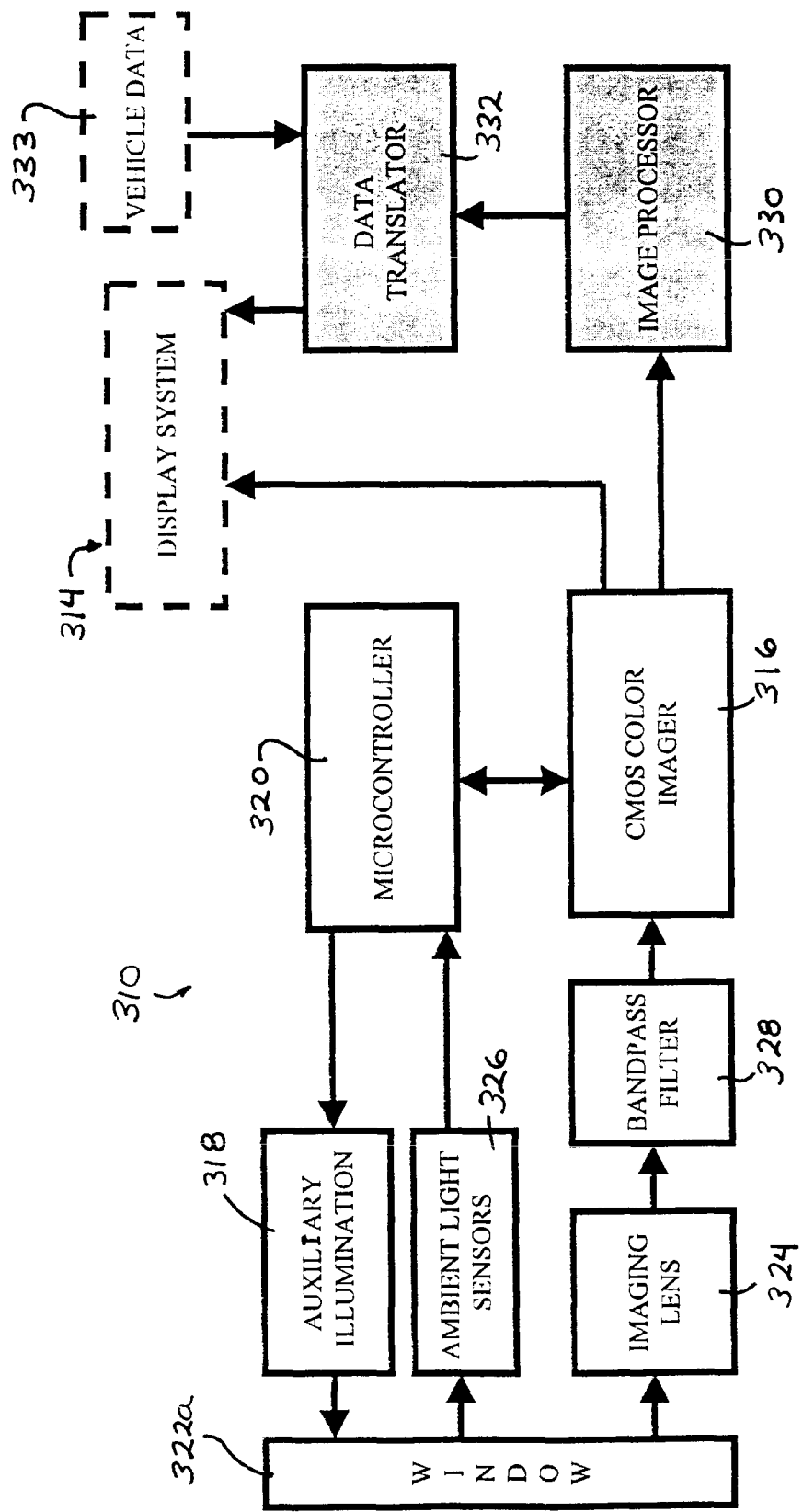
FIG. 25 is a block diagram of an imaging system in accordance with the present invention.
Figure 26:
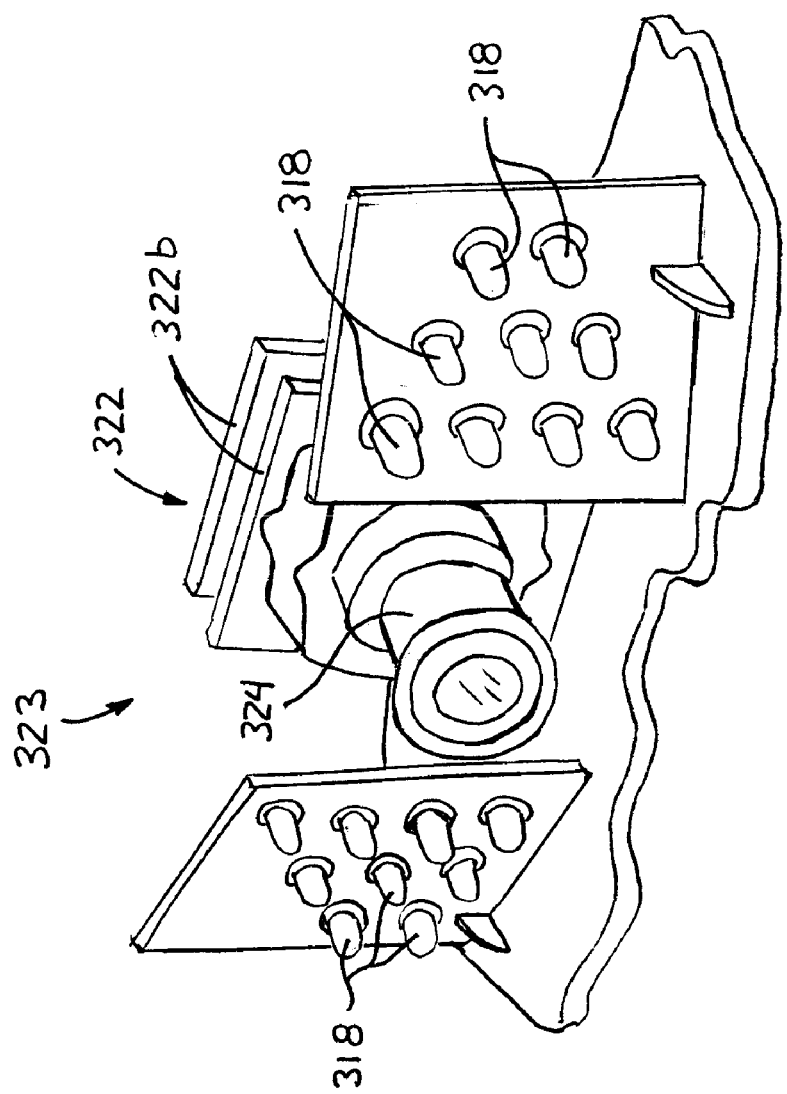
FIG. 26 is a perspective view of an imaging system module in accordance with the present invention, having auxiliary illumination sources.

Referring now to FIGS. 24-26, an image capture system or imaging or vision system 310 is positioned at an exterior portion of a vehicle, such as at a rearward portion 8a of the vehicle 8 (FIGS. 1 and 2), and is operable to capture an image of a scene occurring exteriorly of the vehicle, such as rearwardly of the vehicle, and to display the image at a display or display system 314 of the vehicle which is viewable by a driver of the vehicle. Image capture system 310 includes an image capture device or camera 316 (such as a camera or camera module of the types described above), which is directed exteriorly of the vehicle and has an exterior field of view which at least partially encompasses a "blind spot" area exteriorly of the vehicle. The images or frames captured by image capture device 316 are displayed at display 314 to assist the driver in viewing the blind spot areas, such as the rearward area immediately behind the vehicle for backing up or otherwise driving or maneuvering the vehicle. The image capture system 310 may include one or more auxiliary illumination sources 318 (FIG. 26), which may be selectively operable to provide illumination within the field of view of the image capture device 316 to enhance the illumination of the exterior scene. The image capture system 310 may also include a control or control system or microcontroller or microprocessor 320 for controlling or adjusting the image capture device and/or the illumination sources in response to the light levels in the general vicinity of the imaging system or in response to the contrast ratio in the captured image. For example, the microcontroller may selectively activate one or more illumination sources or LEDs 318, or may selectively switch the imaging sensor 316 from a color mode to a monochromatic or black and white mode, or may apply an infrared or near infrared contribution correction to the color levels of the pixels of the imaging sensor to adjust the color balance for better color rendition in the captured images, in response to the ambient light levels or contrast ratio, as discussed below.

Image capture system 310 may be positioned at the exterior portion of the vehicle and directed generally exteriorly of the vehicle for capturing images of the exterior scene to assist the driver in maneuvering or driving the vehicle. Image capture system 310 may utilize principles of other vehicle vision or imaging systems, such as a forwardly, sidewardly or rearwardly directed vehicle vision system or imaging system or the like utilizing principles of the systems disclosed in U.S. Pat. Nos. 5,550,677; 5,670,935; 5,760,962; 5,796,094; 5,877,897; 5,949,331; 6,097,023; 6,201,642; 6,222,447; 6,302,545; 6,313,454; 6,320,176; 6,353,392; 6,396,397; 6,498,620; 6,523,964; 6,559,435 and 6,611,202, and U.S. patent application Ser. No. 09/441,341, filed Nov. 16, 1999, now U.S. Pat. No. 7,339,149; Ser. No. 10/427,146, filed Apr. 30, 2003, now U.S. Pat. No. 6,831,261; Ser. No. 09/199,907, filed Nov. 25, 1998, now U.S. Pat. No. 6,717,610; Ser. No. 10/372,873, filed Feb. 24, 2003, now U.S. Pat. No. 6,802,617; Ser. No. 10/011,517, filed Nov. 5, 2001, now U.S. Pat. No. 6,806,452; Ser. No. 10/324,679, filed Dec. 20, 2002, now U.S. Pat. No. 6,891,563; Ser. No. 10/047,901, filed Jan. 14, 2002, now U.S. Pat. No. 6,822,563; Ser. No. 10/643,602, filed Aug. 19, 2003, now U.S. Pat. No. 7,859,565; and Ser. No. 10/010,862, filed Dec. 6, 2001, now U.S. Pat. No. 6,757,109, which are hereby incorporated herein by reference. The imaging system may be operable to captures images of the scene immediately rearward of the vehicle to assist the driver of the vehicle in backing up or maneuvering the vehicle in reverse. The backup assist system may be operable in response to the reverse gear of the vehicle being selected.

Image capture device or camera or imaging sensor 316 may comprise an imaging array sensor or a pixelated imaging array, such as a multi-pixel array such as a CMOS sensor or a CCD sensor or the like, such as the types disclosed in commonly assigned U.S. Pat. Nos. 5,550,677; 5,670,935; 5,796,094; 6,097,023 and 6,498,620, and U.S. patent application Ser. No. 09/441,341, filed Nov. 16, 1999, now U.S. Pat. No. 7,339,149; and Ser. No. 09/793,002, filed Feb. 26, 2001, now U.S. Pat. No. 6,690,268, which are hereby incorporated herein by reference, or such as an extended dynamic range camera, such as the types described above. For example, the imaging sensor may comprise a CMOS camera, such as the OV7930 single chip CMOS color NTSC camera available from OmniVision Technologies Inc. of Sunnyvale, Calif. Such color cameras may have the performance characteristics identified above and may additionally provide RGB and/or YCrCb video signals. Preferably, the color video camera operates at a minimum illumination (3000 K) of less than about 5 lux at f1.2, more preferably of less than about 3 lux at f1.2, and most preferably less than about of less than about 2 lux at f1.2. Such CMOS imaging sensors typically may have a peak sensitivity in the near infrared range, such as at approximately 850 nm to 900 nm.

Such pixelated imaging sensors may include a plurality of pixels, with at least some of the pixels masked or covered with a particular color filter, such that the individual pixels function to capture a particular color, such as red, green and blue colors or the like, such as disclosed in U.S. Pat. Nos. 5,550,677; 5,670,935; 5,796,094; 6,097,023 and 6,498,620, referenced above. For example, the imaging sensor 16 may comprise an individual blue or a green or a red color filter over each pixel element of the CMOS multi-pixel element array. The imaging sensor is thus operable to provide color images to the display. Such RGB filters enable the capture of a color image by the CMOS detector, but necessarily result in a reduced or decreased low light level sensitivity for a color camera compared to a monochromatic or black and white camera. Optionally, and preferably, the imaging sensor may be capable of selectively operating in either a color mode, in which a color image may be displayed on display 314, or a monochromatic or black and white mode, in which a monochromatic or black and white image may be displayed on display 314, such as by utilizing aspects of the imaging sensor disclosed in U.S. Pat. No. 6,498,620, which is hereby incorporated herein by reference.

In the illustrated embodiment of FIG. 26, the image capture device 316 is at least partially contained within an imaging module or camera module 322, which includes imaging sensor or camera 316 and a lens 324 positioned within a housing (such as similar to housing 11 of camera module 10, discussed above) which defines a transparent window 322a (which may comprise an at least substantially transparent glass or polycarbonate or acrylic (or other suitable material) window or panel) at the end of lens 324 (such as described above with respect to camera module 10, 10'). The imaging module 322 may include the circuitry and controls for imaging sensor 316, such as on one or more printed circuit boards 322b (FIG. 26) contained within the housing. The imaging module 322 is shown in FIG. 26 without the housing for purposes of clarity.

As shown in FIG. 26, imaging module 322 may be positioned at or adjacent to a plurality of illumination sources 318 to define an imaging system module 323. The illumination sources 318 may be operable to emit or project illumination in the general direction that the imaging sensor 316 and lens 324 are directed. Preferably, the illumination sources project or emit substantially uniform illumination directly behind the vehicle where the vehicle back up lights do not typically provide adequate illumination. The illumination sources may be selected to provide sufficient intensity over the targeted area to maintain the minimum acceptable contrast ratio (such as about 18 dB) in the displayed images.

The illumination sources 318 may comprise infrared or near infrared emitting light emitting diodes (LEDs) or the like and thus may emit light or energy in the infrared or near infrared range (such as energy having a wavelength of approximately 750 nm or greater). The infrared illumination may be provided via pulsing the illumination sources or generally continuously activating the illumination sources. An exemplary near-infrared emitting LED to use in conjunction with the imaging system of the present invention is available from Lumex Inc. of Palatine, Ill. under the trade name OED-EL-1L2. This is a T-5 mm, leaded, clear epoxy—60 degree LED that emits essentially no visible light but that has a peak spectral emission of about 940 nm. Forward current through such infrared LEDs is typically less than about 150 mA, more preferably less than about 100 mA, and most preferably less than about 80 mA. Power consumption by such infrared LEDs is typically less than about 350 mW, more preferably less than about 250 mW, and most preferably is less than about 150 mW. Such LEDs can be powered by duty cycling, such as by pulse width modulation or by direct current drive (typically via a load dropping resistor in series with the vehicle ignition supply). Other near-infrared light emitting diodes or the like can be used, such as LEDs with a peak light emission intensity at about 730 nm, at about 780 nm, at about 875 nm, and at about 880 nm. Spectral output for such near-infrared LEDs is preferably in the 5 mW/sr to about 35 mW/sr range. Such near-infrared light emitting diodes emit little or no visible light.

The infrared or near infrared illumination thus may provide improved camera pixel responsivity in low light levels, and the projected infrared or near infrared illumination is not readily visible directly behind the vehicle when the illumination sources are activated. The wavelength of the illumination emitted by the illumination sources may be selected to best balance the camera spectral response and to minimize ambient lighting affects in the captured image. Optionally, auxiliary illumination sources may be selected that emit visible light, as discussed below. Optionally, additional visible light sources (such as visible light emitting LEDs or an incandescent source or a neon source or the like) can illuminate on occasions at night when the driver wants to have visible light illumination of the area immediately exteriorly of the vehicle. Optionally, the auxiliary illumination may be provided via activation of modified back up lights, which may provide visible or infrared or near infrared illumination at the area immediately rearward of the vehicle, such as when the vehicle is shifted to the reverse gear.

With reference to FIG. 25, imaging system 310 includes microcontroller 320, which is operable to control imaging sensor 316 and auxiliary illumination sources 318. The microcontroller 320 may receive an input signal from one or more ambient light sensors 326, which are operable to detect the ambient light levels within the exterior scene. The microcontroller may provide an active camera control and may be operable to adjust or control the imaging sensor and/or the illumination sources in response to the ambient light levels present in the exterior scene. Optionally, the microcontroller may process the captured image to determine the contrast ratio in the images. The microcontroller may then adjust or control the imaging sensor and/or the illumination sources in response to the contrast ratio in order to maintain the image display contrast ratio at a minimum acceptable viewing contrast ratio. For example, the microcontroller may activate or increase the illumination output of the illumination sources to increase the contrast ratio in the captured images to a desired or threshold minimum ratio or level, such as approximately 18 dB.

The imaging sensor 316 may receive or capture images via imaging lens 324 and a bandpass filter 328, all of which may be positioned behind the transparent window of camera module 322. The images captured by imaging sensor 316 may be received by an image processor 330 and data translator 332, which may process the images or pixel outputs as desired. For example, the image processor 330 and data translator 332 may be operable to process the images to determine if an object is present in the detected image, such as by utilizing the principles disclosed in U.S. patent application Ser. No. 10/427,051, filed Apr. 30, 2003, now U.S. Pat. No. 7,038,577, which is hereby incorporated herein by reference, or may process the captured images to extract other information therefrom, without affecting the scope of the present invention. The data translator 332 may also receive inputs 333 pertaining to vehicle data or vehicle status data or the like. The images captured may be displayed at the display or display system 314, and/or the processed images or information derived or extracted from the processed images may be displayed at the display or display system 314.

During normal day time conditions or high ambient light conditions (for example, when the ambient light sensor or sensors 326 detect an ambient light level which is greater than a threshold light level or when the microcontroller determines that the contrast ratio of the captured images is greater than the minimum acceptable viewing contrast ratio), imaging sensor 316 may provide color images which provide a color rendition consistent with the driver's expectations (in other words, consistent with real world colors). The imaging sensor or camera may be switched or set to a color mode when ambient light levels are at or increase to a sufficient level at or above a minimum or threshold level, and thus may capture color images and may provide color images to the display system during such lighting conditions. The camera or system may also include an automatic color balance algorithm which may function to adjust or optimize the colors in the captured image to the visible spectrum of light, as discussed below.

As disclosed in U.S. Pat. Nos. 5,550,677; 5,670,935; 5,796,094; 6,097,023 and 6,498,620, and U.S. patent application Ser. No. 09/441,341, filed Nov. 16, 1999, now U.S. Pat. No. 7,339,149; and Ser. No. 09/793,002, filed Feb. 26, 2001, now U.S. Pat. No. 6,690,268, which are hereby incorporated herein by reference, the pixels of the imaging array sensor 316 may be individually operable to measure a particular color or range of color (such as red, green and blue) in the visible spectrum to determine the color image. Any near infrared radiation or infrared radiation that is received by the pixels may add to the measured value of the particular color that the particular pixel senses or accumulates. This results in a shift in the representation in the color of the captured image and may result in an image having unsatisfactory or unrepresentative color. Optionally, and as discussed below, the band pass filter 328 of the imaging system may comprise an infrared or near infrared filter, which may filter out or substantially block light in the infrared and/or near infrared range of the spectrum, such as light having wavelengths in the approximately 750 to 900 nm, and preferably blocking or reducing transmission of some light in the visible region of the electromagnetic spectrum so that band pass filter 328 passes (i.e. is highly transmitting to) visible wavelengths up to about 650 nm or thereabouts, but has reduced transmission above about 650 nm and, in particular, has substantially reduced transmission in the near infrared region.

In order to correct the color balance in the captured images, the image capture system of the present invention may subtract fixed values from the particular color values (e.g., red, green, blue) of each pixel, such that the imaging system may provide an infrared or near infrared contribution correction in situations where the infrared or near infrared light present in the scene (such as from solar radiation) may otherwise washout or distort or otherwise adversely affect the color balance of the captured images. The offset or subtracted values may be a generally fixed intensity offset or value or may be based on the ambient light levels detected by the ambient light sensor or by a combination of pixels of the imaging sensor or the like.

Optionally, the infrared radiation present in the exterior scene may be measured, such as via an infrared sensor positioned at the lens 324, imaging sensor 316 or window 322a of camera module 322. The measured infrared radiation may be factored into the infrared contribution correction amount to provide an improved and dynamic correction for the pixels. It is further envisioned that the offset for the particular colors (e.g., red, green, blue) may be different between the colors (for example, in certain lighting conditions, there may be more of an offset for one color, such as, for example, red, than the other color or colors, such as green and blue). The imaging system may thus provide a detection of the infrared radiation and may provide a dynamic correction of each pixel color. The imaging system thus may provide a sensor driven offset or correction. The sensor or sensors may comprise an infrared sensor (with a visible light filter) by itself or in combination with a second sensor which senses visible light (with an infrared filter), to determine the infrared level or intensity in the exterior scene.

Optionally, some of the pixels of the imaging array sensor 316 may be unmasked or unfiltered, such that they capture or accumulate the entire spectrum of light (or at least substantially the entire spectrum of light) present in the scene. The unmasked pixels thus are dedicated to sensing the visible and infrared light present in the exterior scene and may provide a basis for determining the offset that is to be applied to the color value of the masked pixels. In such an embodiment, the image capture device would not include an infrared filter, or at least not an infrared filter over the entire pixelated array (however, an infrared filter at the pixel level may be provided, such as an infrared filter at each of the individual color pixels, which also include a mask or filter associated with the particular color that the individual pixel is to capture).

The imaging sensor 316, which may comprise a CCD or CMOS camera or the like, may thus operate sufficiently well with its factory settings at illumination levels between a few lux and several thousand lux (such as may be present in normal indoor lighting conditions). When the available ambient illumination is below these levels, however, the camera may have a difficult time distinguishing features in the captured image as compared to the background noise of the camera, and thus may not be able to maintain the minimum contrast ratio during such low light levels. To address this deficiency, the auxiliary illumination sources 318 may be selectively activated to project auxiliary illumination throughout the field of view of the camera, in order to provide sufficient illumination levels for the camera to operate properly. The illumination sources may be selectively activated or controlled by the microcontroller in response to the ambient light levels detected by ambient light sensor or sensors 326 or by imaging sensor 316 (such as in response to a detection that the ambient light level has dropped or reduced to a threshold reduced light level), or in response to the contrast ratio in the captured image (such as in response to the contrast ratio being less than a desired or threshold amount, such as approximately 18 dB).

Optionally, the auxiliary illumination sources 318 may emit or project or provide visible light to the exterior scene. In such applications where visible light is provided by the auxiliary illumination sources (or where sufficient visible light may be provided by the backup lights or other lights or illumination sources of the vehicle), the band pass filter 328 may comprise an infrared or near infrared filter (or visible light pass filter) and may provide a cutoff or block at approximately 650 nm, such that the near infrared and infrared spectral regions (and preferably a portion of the visible light region of the spectrum) are limited or blocked from the imaging sensor or camera 316. Because greater visible illumination may thus be provided via the illumination sources in low ambient light conditions, while the infrared and near infrared illumination present in the exterior scene may be filtered or substantially blocked, the imaging system may be capable of capturing images during such lighting conditions which may have acceptable color balance, or which may require a reduced amount of processing or color adjustment to achieve the appropriate or acceptable color balance and contrast ratio. The filter pass or cutoff wavelength range may be selected to tailor the filter cutoff wavelength to the particular application (depending on the illumination provided to the exterior scene and the capabilities of the imaging sensor). The imaging system thus may provide improved imaging capabilities in low light conditions, while providing an appropriate color balance and contrast ratio for the images captured in all ambient lighting conditions.

In applications where the auxiliary illumination source or sources comprise infrared or near infrared illumination sources or LEDs, the microcontroller may switch the color camera from the color mode (where the camera captures color images and the display displays color images) to a monochromatic or black and white mode (where the camera captures monochromatic images). The microcontroller may switch the imaging sensor to the black and white mode in response to the ambient light level dropping to the threshold level or in response to the illumination sources being activated. Such a monochromatic mode is preferred in reduced visible lighting conditions and/or when the infrared emitting illumination sources are activated because the automatic color balance algorithm of the imaging system functions to optimize the color in the captured image to the visible spectrum, and may not function as well in such infrared or non-visible lighting conditions. Once the infrared or near infrared illumination is introduced by the illumination sources, the color balance control may be insufficient, which may result in a washed out or distorted image. The black and white image provided by the black and white mode may thus be more pleasing for viewing by the driver of the vehicle during such lighting conditions. The image sensor may quickly switch between the color mode and black and white mode and may provide a smooth transition from one mode to the other.

With reference to FIG. 25, the following illustrates the sequence of events that may trigger or initiate the low-light mode of the imaging system of the present invention. The microcontroller 320 may read or receive an output from one or more ambient light sensors 326, which may be positioned at or near imaging sensor 316 and which may be operable to detect or sense the ambient light present in the exterior scene. The microcontroller may also determine the contrast ratio of the images being captured by the imaging sensor. When the ambient light levels are determined to be below a low-light mode calibrated value or threshold value (or when the contrast ratio drops below the threshold level), the microcontroller may then initiate new commands to the imaging sensor or camera 316, such as via an I2C serial link or the like. The new register commands may consist of defeating the automatic gain, exposure and color modes of the imaging sensor 316. The exposure may be set to maximum frame integration time and the amplifier gain may, for example, be set to ½ maximum. This combination provides an enhanced or optimal signal to noise ratio for such lighting conditions.

The microcontroller may enter the monochromatic or color defeat mode, whereby the microcontroller may select either a single color kill register or a combination of modifying the color matrix registers to negate the color balance of the imaging sensor. The microcontroller may also enable the infrared LEDs via a logic control signal or the like, so that infrared or near infrared illumination is provided to the exterior scene. The low light mode camera settings may then be maintained until one or more of the ambient light sensors returns values or signals to the microcontroller which are above or outside the calibrated or threshold low-light mode range. Once this occurs, the imaging sensor may be set to the color mode and the above mentioned registers may be again updated with new values, and the illumination sources or LEDs may be disabled. The imaging sensor, such as a CMOS camera or the like, may implement the register updates within approximately two frame times (i.e., the time it takes to capture two consecutive frames or images), which may be within approximately 66 ms, depending on the particular imaging sensor used with the imaging system of the present invention.

Because the imaging system of the present invention may correct for washout or distortion in the color values to account for infrared and near infrared illumination in the exterior scene, and because the imaging system may switch to a monochromatic mode when conditions darken and/or when the illumination sources are activated, the present invention may obviate the need or desirability of providing an infrared filter at the imaging sensor, since such a filter may filter out some of the infrared or near infrared illumination provided by the illumination sources when the imaging system is in the low light mode. However, it is envisioned that such a band pass filter or infrared filter element may optionally be provided at the imaging sensor to attenuate at least some of the infrared radiation that may be present in the exterior scene. For example, an infrared filter may be provided that is highly transmitting (such as an integrated photopic visible transmission of at least about 75% transmitting, more preferably at least about 80% transmitting, and most preferably at least about 85% transmitting) in the visible light region between about 300 nm and 800 nm (where the eye's photopic response is sensitive), and more preferably in the 400 nm to 700 nm spectral range, and that has a lower or reduced transmissivity or is lowly transmitting in the 800 nm to 1100 nm region (at least) with a spectral transmission in the 750 nm to 1100 nm of less than about 5% transmission preferred, less than about 3% more preferred, and less than about 1% most preferred. Such infrared filter elements typically consist of a transparent substrate (typically glass) coated with a multilayer stack (typically at least three layers, more preferably at least five layers, most preferably at least seven layers, and typically deposited by vacuum deposition such as by sputtering or evaporation) of metal oxides and similar dielectric thin film layers that form a broad band visible band pass filter with a sharp spectral cut off around 700 nm or so. Such infrared filters typically operate by light interference, and preferably act as cold mirrors reflecting away near-infrared radiation while being highly transmitting to visible light. An example of an infrared filter element suitable for use with the imaging system of the present invention is available from Maier Photonics, Inc. of Manchester Center, Vermont under the part designation "p/n SP730/14s". This filter element has a 50% cut-off at +/−10 nm at normal incidence, and comprises a 1 mm thick soda-lime glass substrate. Alternately, a WBHM infrared filter element available from OCLI of Santa Rosa, Calif. can be used (which has an average transmission equal to or greater than 80% from approximately 400 nm to 700 nm and an average transmission less than or equal to 2% from approximately 750 nm to 1100 nm). Also, an infrared filter element from Evaporated Coatings, Inc. of Willow Grove, Pa. comprising a Corning Micro-Sheet Glass 0211 coated with ECI #1010 can be used. This filter element has an average transmission equal to or greater than 85% at 400 nm to 700 nm; a partial transmission of about 80% at 740 nm (+/−10 nm); a partial transmission of about 50% at 750 nm (+/−10 nm); and an average transmission of less than about 3% at 780 nm to 1100 nm. Such infrared filter elements are abrasion resistant per MIL-C-675A, which is hereby incorporated by reference herein. Such infrared filters may be disposed in the camera assembly in front of the CMOS or CCD imaging array sensor (either in front of the camera lens or between the camera lens and the video detector array).

However, a problem can arise when a camera equipped with an infrared element as described above is used in conjunction with near infrared light emitting sources such as those also described above. The near infrared cut off of the camera filter may also severely attenuate and/or block the near infrared radiation emitted by the near infrared LEDs (or similar near-infrared emitting sources) such that nighttime illumination may be inadequate to be useful/valued by the driver. In order to avoid such concerns, while still providing such an infrared filter, the infrared filter and illumination sources may be selected such that at least some of the infrared illumination emitted by the illumination sources is not filtered or blocked by the infrared filter. For example, the filter may be selected that may cut out or substantially block radiation having wavelengths above approximately 950 nm, while the illumination source may emit light having wavelengths of approximately 800 nm to 900 nm. Optionally, and as discussed above, the auxiliary illumination sources may be operable to emit or project visible light to provide adequate visible illumination to the exterior scene, whereby the infrared and near infrared light may not be required by the imaging sensor (and thus may be filtered or blocked, such as at a wavelength of approximately 650 nm and above) in order to provide appropriate clarity and color balance in the images captured by the imaging sensor.

Optionally, it is further envisioned that the imaging system may function to remove the infrared filter from in front of the imaging sensor when the infrared illumination sources are activated, such as described in U.S. patent application Ser. No. 09/793,002, filed Feb. 26, 2001, now U.S. Pat. No. 6,690,268, which is hereby incorporated herein by reference. For example, at nighttime when ambient lighting is low and the infrared emitting illumination sources are activated, the infrared filter element may be moved out of the field of view of the lens so that the detector or camera can view unattenuated infrared radiation from the infrared emitting illumination sources so that the output image in the video display is discernable by the driver. Various means can be used to remove the infrared filter element from the camera field of view during nighttime. For example, an electromechanical mechanism, preferably operated by the microcontroller in response to a photo sensor or ambient light sensor, can automatically move the infrared filter element, such as by electrical command, out of the line of sight or field of view of the imaging sensor when the ambient lighting conditions are low.

Optionally, electro-optic means can be used to prevent color wash out by day while maximizing low light sensitivity by night. For example, an electrochromic infrared filter can be used, such as a filter utilizing the principles disclosed in U.S. Pat. No. 6,426,492, and U.S. patent application Ser. No. 10/206,558, filed Jul. 26, 2002, now U.S. Pat. No. 6,667,471, which are hereby incorporated herein by reference. The filter may include a tungsten oxide electrochromic layer that changes from being substantially visible light transmitting and substantially near-infrared transmitting when uncharged (bleached) and transforms to being significantly near-infrared absorbing/reflecting as well as being significantly visible light attenuating when cathodically charged. The degree of near-infrared attenuation and visible light attenuation is proportional to the negative voltage applied to the electrochromic tungsten oxide metal oxide layer, with applied voltages in the 0.1 V to about 2.5 V range typical. The higher the cathodic voltage applied, the more the near-infrared/visible light attenuation.

Optionally, the imaging system of the present invention may additionally include a plurality of infrared shutters which are in the optical path the imaging array sensor, such as disclosed in U.S. Pat. No. 6,498,620, which is hereby incorporated herein by reference. Each infrared shutter has at least one state in which infrared energy is generally not attenuated to the imaging sensor. In another state, the infrared shutter generally blocks infrared radiation from the array. The state of the infrared shutters may be controlled by the microcontroller, which may control the shutters in response to the ambient light levels in the exterior scene, such as detected by the ambient light sensor or sensors. During periods of high image luminance, the infrared shutters may switch to a state in which the shutters block near infrared radiation from the imaging sensor. However, during low image luminance conditions, the infrared shutters may switch to a state in which the shutters allow the near infrared energy to be transmitted to the imaging sensor. The addition of the near infrared radiation at low luminance levels enhances the image luminance sensed by the imaging sensor. The imaging sensor may also be switched to the monochromatic or black and white mode during such low luminance levels. The infrared shutters may be either electrochromic shutters or liquid crystal shutters, both of which are known in the art.

Although many aspects of the present invention are particularly suitable for applications having a CMOS type image sensor or camera (due to the high infrared sensitivity of CMOS cameras), other types of cameras or sensors may be implemented, such as CCDs, etc., without affecting the scope of the present invention.

Therefore, the present invention provides an imaging system which may provide enhanced imaging during nighttime conditions, while providing optimal color imaging during daytime conditions. The imaging system may determine the ambient light levels at the exterior scene, such as via ambient light sensors or photosensors, which may be associated with the camera or imaging array sensor, or which may be separate ambient light sensors. When the ambient light levels drop below a threshold level, the color mode of the imaging sensor may be turned off, such that the imaging sensor operates in a monochromatic or black and white mode in such low light conditions, thereby providing an enhanced image to the display for viewing by the driver of the vehicle. Also, the illumination sources (which are preferably infrared or near infrared illumination sources or LEDs) may be activated when the ambient light levels are low, so as to provide additional, substantially non-visible light to the exterior scene. Optionally, the illumination sources may be activated to illuminate the targeted area to increase the contrast ratio in the displayed images to a desired amount in response to the contrast ratio falling below a minimum acceptable viewing contrast ratio. Because the imaging sensors may then be operating in a black and white mode, the infrared illumination emitted by the illumination sources will not result in washed out or saturated or distorted color images. Also, because the imaging sensor may have a peak sensitivity in the infrared or near infrared range, and because the illumination sources may be infrared emitting sources, the imaging sensor may be capable of capturing images in very low lighting conditions, whereby the illumination for the imaging sensor is provided by the infrared illumination sources.

Optionally, when the imaging sensor is operating in the color mode, the microcontroller may adjust or correct the color balance via an adjustment of the pixel output for each of the color sensing pixels of the pixelated imaging array sensor. The present invention thus may provide a dynamic color balance adjustment function for a vehicular color exterior-viewing camera, such as one viewing rearward of the vehicle or forward of the vehicle or sideways of the vehicle, such as may be achieved by placing the camera module with integrated auxiliary illumination into an exterior rearview mirror assembly with its field of view directed toward and onto a ground surface adjacent the side body of the vehicle (in this regard, and when auxiliary illumination is required, and when the camera-equipped exterior mirror assembly includes a visible light emitting ground illumination/security light, such as are disclosed in U.S. Pat. Nos. 6,276,821; 6,176,602; 5,823,654; 5,669,699; 5,497,306 and 5,371,659, which are hereby incorporated herein by reference, the ground illumination/security light may optionally be selectively actuated to add additional auxiliary illumination in certain circumstances, such as when about to or first starting to drive the vehicle from a parked position). Preferably, such dynamic adjustment of color balance is achieved by determination of the level of near-infrared radiation incident the camera module and by using this determined level (via a closed-loop or an open-loop control algorithm) to adjust the color balance and/or other characteristics (such as selection of the monochrome or black and white mode) of the video camera system employed. Other camera functions, such as iris function or exposure function, may optionally be similarly dynamically adjusted commensurate with a detected ambient near-infrared or other light level at the camera module. The present invention also finds applicability to interior cabin monitoring systems.

Changes and modifications to the specifically described embodiments may be carried out without departing from the principles of the present invention, which is intended to be limited only by the scope of appended claims, as interpreted according to the principles of patent law.

The invention claimed is:

1. A vehicular camera module, the vehicular camera module comprising:
   a CMOS image sensor and a lens;
   a first printed circuit board having a first side and a second side opposite the first side;
   a second printed circuit board having a first side and a second side opposite the first side;
   wherein circuitry of the second printed circuit board is in board-to-board electrical connection with circuitry of the first printed circuit board;
   wherein board-to-board electrical connection between circuitry of the first and second printed circuit boards is via a multi-wire ribbon connection connecting the first printed circuit board with the second printed circuit board;

wherein the circuitry of the first printed circuit board comprises the CMOS image sensor, and wherein the CMOS image sensor is disposed at the first side of the first printed circuit board;

a housing that houses the first and second printed circuit boards;

wherein the vehicular camera module is configured for mounting at an exterior portion of a vehicle;

wherein, with the vehicular camera module mounted at the exterior portion of the vehicle, the vehicular camera module has a field of view external of the vehicle;

wherein the CMOS image sensor is operable to capture image data;

wherein image data captured by the CMOS image sensor is processed by an image processor; and wherein, with the vehicular camera module mounted at the exterior portion of the vehicle and responsive at least in part to processing by the image processor of image data captured by the CMOS image sensor, an object in the field of view of the vehicular camera module is detected.

2. The vehicular camera module of claim 1, wherein, responsive at least in part to processing by the image processor of image data captured by the CMOS image sensor, distance to the detected object is determined.

3. The vehicular camera module of claim 2, wherein the vehicular camera module comprises shielding to reduce electronic noise.

4. The vehicular camera module of claim 1, wherein the vehicular camera module comprises a rear backup camera of the vehicle.

5. The vehicular camera module of claim 1, wherein the CMOS image sensor captures 30 frames of image data per second.

6. The vehicular camera module of claim 1, wherein the vehicular camera module comprises a heater element.

7. The vehicular camera module of claim 1, wherein the first and second printed circuit boards are spaced apart and are oriented parallel one to the other.

8. The vehicular camera module of claim 1, wherein the vehicular camera module comprises a semi-permeable ventilation portion that is at least partially permeable to water vapor.

9. The vehicular camera module of claim 8, wherein the semi-permeable ventilation portion comprises a material that is at least partially permeable to water vapor.

10. The vehicular camera module of claim 1, wherein the vehicular camera module has a dynamic range that follows, at least in part, a linear response curve.

11. The vehicular camera module of claim 1, wherein the vehicular camera module has a dynamic range that follows, at least in part, a non-linear response curve.

12. The vehicular camera module of claim 1, wherein the vehicular camera module has a linear dynamic range of at least 62 dB.

13. The vehicular camera module of claim 12, wherein the vehicular camera module has a linear dynamic range of at least 100 dB.

14. The vehicular camera module of claim 1, wherein the vehicular camera module has a dynamic range that comprises a linear region followed by a non-linear region.

15. A vehicular camera module, the vehicular camera module comprising:

a CMOS image sensor and a lens;

a first printed circuit board having a first side and a second side opposite the first side;

a second printed circuit board having a first side and a second side opposite the first side;

wherein circuitry of the second printed circuit board is in board-to-board electrical connection with circuitry of the first printed circuit board;

wherein board-to-board electrical connection between circuitry of the first and second printed circuit boards is via a multi-wire ribbon connection connecting the first printed circuit board with the second printed circuit board;

wherein the circuitry of the first printed circuit board comprises the CMOS image sensor, and wherein the CMOS image sensor is disposed at the first side of the first printed circuit board;

a housing that houses the first and second printed circuit boards;

wherein the vehicular camera module is configured for mounting at a windshield of a vehicle;

wherein, with the vehicular camera module mounted at the windshield of the vehicle, the vehicular camera module has a field of view through the windshield and at least forward of the vehicle;

wherein the CMOS image sensor is operable to capture image data;

wherein image data captured by the CMOS image sensor is processed by an image processor; and wherein, with the vehicular camera module mounted at the windshield of the vehicle and responsive at least in part to processing by the image processor of image data captured by the CMOS image sensor, an object in the field of view of the vehicular camera module is detected.

16. The vehicular camera module of claim 15, wherein, responsive at least in part to processing by the image processor of image data captured by the CMOS image sensor, distance to the detected object is determined.

17. The vehicular camera module of claim 15, wherein, with the vehicular camera module mounted at the windshield of the vehicle and responsive at least in part to processing by the image processor of image data captured by the CMOS image sensor, a vehicle headlamp control system of the vehicle is controlled.

18. The vehicular camera module of claim 15, wherein the vehicular camera module comprises shielding to reduce electronic noise.

19. The vehicular camera module of claim 15, wherein the CMOS image sensor captures 30 frames of image data per second.

20. The vehicular camera module of claim 15, wherein the first and second printed circuit boards are spaced apart and are oriented parallel one to the other.

21. The vehicular camera module of claim 15, wherein the vehicular camera module comprises a semi-permeable ventilation portion that is at least partially permeable to water vapor.

22. A vehicular camera module, the vehicular camera module comprising:

a CMOS image sensor and a lens;

a first printed circuit board having a first side and a second side opposite the first side;

a second printed circuit board having a first side and a second side opposite the first side;

wherein circuitry of the second printed circuit board is in board-to-board electrical connection with circuitry of the first printed circuit board;

wherein board-to-board electrical connection between circuitry of the first and second printed circuit boards is via a multi-wire ribbon connection connecting the first printed circuit board with the second printed circuit board;

wherein the circuitry of the first printed circuit board comprises the CMOS image sensor, and wherein the CMOS image sensor is disposed at the first side of the first printed circuit board;

a housing that houses the first and second printed circuit boards;

wherein the vehicular camera module is configured for mounting at a rear portion of a vehicle;

wherein, with the vehicular camera module mounted at the rear portion of the vehicle, the vehicular camera module has a field of view external and at least rearward of the vehicle;

wherein the CMOS image sensor is operable to capture image data;

wherein image data captured by the CMOS image sensor is processed by an image processor; and wherein, with the vehicular camera module mounted at the rear portion of the vehicle and responsive at least in part to processing by the image processor of image data captured by the CMOS image sensor, an object in the field of view of the vehicular camera module is detected.

23. The vehicular camera module of claim 22, wherein the vehicular camera module comprises shielding to reduce electronic noise.

24. The vehicular camera module of claim 22, wherein the CMOS image sensor captures 30 frames of image data per second.

25. The vehicular camera module of claim 22, wherein the vehicular camera module comprises a heater element.

26. The vehicular camera module of claim 22, wherein the vehicular camera module comprises a semi-permeable ventilation portion that is at least partially permeable to water vapor.

27. The vehicular camera module of claim 22, wherein the first and second printed circuit boards are spaced apart and are oriented parallel one to the other.

28. The vehicular camera module of claim 27, wherein the vehicular camera module comprises a rear backup camera of the vehicle.

* * * * *